(12) United States Patent
Marshall et al.

(10) Patent No.: US 7,760,362 B1
(45) Date of Patent: Jul. 20, 2010

(54) TELESCOPE INTERFEROMETRIC MAINTENANCE EVALUATION TOOL

(75) Inventors: Kenneth Howard Marshall, Viera, FL (US); Paul T H Currie, Colorado Springs, CO (US); Joseph Salg, Oviedo, FL (US); Joseph B. Houston, Saratoga, CA (US); James Harvey, Lake Forest, FL (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 12/453,384

(22) Filed: May 8, 2009

Related U.S. Application Data

(62) Division of application No. 11/727,542, filed on Mar. 27, 2007.

(51) Int. Cl.
 *G01B 9/02* (2006.01)
(52) U.S. Cl. ...................................... 356/450
(58) Field of Classification Search ................. 356/450, 356/508, 511–514
See application file for complete search history.

(56) References Cited

U.S. PATENT DOCUMENTS

| | | | |
|---|---|---|---|
| 3,836,256 A | 9/1974 | Peters | |
| 4,340,304 A | 7/1982 | Massie | |
| 4,392,710 A | 7/1983 | Rogers | |
| 5,144,574 A | 9/1992 | Morita | |
| 5,289,397 A | 2/1994 | Clark et al. | |
| 5,448,639 A | 9/1995 | Arazi | |
| 5,570,307 A | 10/1996 | Takahashi | |
| 5,835,862 A | 11/1998 | Nykanen et al. | |
| 5,961,578 A | 10/1999 | Nakada | |
| 6,064,740 A | 5/2000 | Curiger et al. | |
| 6,085,210 A | 7/2000 | Buer | |
| 6,141,422 A | 10/2000 | Rimpo et al. | |
| 6,151,393 A | 11/2000 | Jeona | |
| 6,182,104 B1 | 1/2001 | Foster et al. | |
| 6,209,016 B1 | 3/2001 | Hobson et al. | |
| 6,356,636 B1 | 3/2002 | Foster et al. | |
| 6,377,969 B1 | 4/2002 | Orlando et al. | |
| 6,415,310 B1 | 7/2002 | Takenaka et al. | |
| 6,748,410 B1 | 6/2004 | Gressel et al. | |
| 7,046,800 B1 | 5/2006 | Tenca et al. | |
| 7,092,103 B1 | 8/2006 | Kendrick et al. | |
| 7,111,166 B2 | 9/2006 | Dror et al. | |
| 7,224,469 B2 | 5/2007 | Harned et al. | |

(Continued)

OTHER PUBLICATIONS

Vazquez y Montiel, Sergio et al. "Evalutation of the image quality of telescopes using the star test". Proceedings of SPIE, vol. 5489, 2004, pp. 1192-1202.

(Continued)

*Primary Examiner*—Michael A Lyons
(74) *Attorney, Agent, or Firm*—Davidson Berquist Jackson & Gowdey LLP

(57) ABSTRACT

A system and method for testing telescope optics are disclosed. The telescope optics can be testing in-situ, thus more accurately revealing the as-used optical conditions. The optical conditions are input to a test system which, by objective analysis, reveals a condition of the optics and an indication of the need for corrective action. A test bench for testing optics and for validating the test system using modeled telescope optics is also disclosed.

2 Claims, 28 Drawing Sheets

U.S. PATENT DOCUMENTS

| | | | |
|---|---|---|---|
| 7,511,895 B2 * | 3/2009 | George et al. | 359/722 |
| 7,626,771 B2 * | 12/2009 | Yokoyama | 359/754 |
| 2002/0039418 A1 | 4/2002 | Dror et al. | |
| 2002/0059353 A1 | 5/2002 | Koc et al. | |
| 2003/0031316 A1 | 2/2003 | Langston et al. | |
| 2003/0140077 A1 | 7/2003 | Zaboronski et al. | |
| 2003/0212729 A1 | 11/2003 | Eberle et al. | |
| 2004/0054705 A1 | 3/2004 | Le Quere | |
| 2004/0066934 A1 | 4/2004 | Chen | |
| 2004/0260741 A1 | 12/2004 | Plessier | |
| 2005/0206908 A1 | 9/2005 | Harned et al. | |

OTHER PUBLICATIONS

"Zernike Polynomials", date unkown, found at web address: http//wyant.opt-sci.arizona.edu/math.htm; 17 pages.

Spring, Kenneth R. et al., "Modulation Transfer Function", MICROSCOPYU.com, date unkown, found at web address: www.microscopyu.com/articles/optics/mtfintro.html; 8 pages.

Wyant, James C., "Basic Wavefront Aberration Theory for Optical Metrology", Applied Optics and Optical Engineering, vol. XI (1992), pp. 1-53.

* cited by examiner

TELESCOPE INTERFEROMETRIC MAINTENANCE EVALUATION TOOL

This application is a divisional of U.S. patent application Ser. No. 11/727,542. This relates to optic testing, and more particularly to telescope interferometric maintenance evaluation (TIME).

The inventions claimed herein were made with support from the United States government, which has certain rights in the inventions claimed.

This disclosure contains a computer program listing on a single CD-ROM, as an appendix. Two identical copies of the CD-RUM accompany this application, each of the two identical CD-ROMs containing a single file entitled "Source Code Appendix" of 114 KB. The contents of the accompanying CD-ROM appendix, namely the Source Code Appendix, are incorporated by reference herein in their entirety.

INTRODUCTION

The testing of telescopes and their optics presents unique problems. Moving telescopes, especially space telescopes with large optics, is difficult, so testing is preferably done where the telescope resides rather than where the test equipment resides. For that reason, newly constructed telescopes are preferably tested in-shop rather than on-site so the cost and difficulty of delivering and assembling the telescope is highly minimized. Similarly, for already in-situ telescopes, testing is preferably done in-situ rather than in-shop. Also, vibrations, air, and temperature variations in one location (in-situ versus in-shop) can affect the response of the optics, and can vary from the alternative qualities at the alternative location.

The 1951 Air Force Resolution Target has been the standard for optical resolution testing for over 50 years. A copy of the 1951 Air Force Resolution Target is shown in FIG. 1. The purpose of resolution testing is to define a telescope's ability to reproduce points, lines and surfaces in an object as separate entities in an image. The 1951 test method involves the use of a 3 bar target that is illuminated through a set of collimating optics and projected into a telescope under test. The telescope focuses the target onto a film plane or a CCD TV camera sensor and the resultant image is analyzed under a microscope after film development or in a stored electronic file. Successful test validation is measured by the ability to visually discern the 3 bars in an ever-decreasing pattern size.

The 3 Bar target is a subjective measure of evaluating optical resolution performance in line pairs per millimeter and can result in differing opinions by respective analysts. The resolution target method, to be done properly, requires the use of a collimator equal to or exceeding the aperture size of the telescope. By definition, this requires a large collimator when testing large aperture telescopes and makes field evaluation extremely difficult. An alternative is to generate large target boards (to scale), often 4 ft. by 8 ft. or larger and place them at varying distances from the telescope under test. This distance could be up to a few miles away from the telescope but is still subject to the problems stated above. The difficulty and impracticality of testing in the field often leads to the decision to remove the telescope from the site and bring it into an optical laboratory for resolution testing. There are significant risks inherent in this type of operation. Heavy equipment must be used to carefully remove the telescope from the operational site and then transport it, often over considerable distance, to the laboratory. This introduces the possibility of damage or optical misalignment of the telescope during the effort.

Interferometric testing equipment is a highly accurate method of testing telescopic equipment. Laser Unequal Path Interferometers are the modern standard for testing large optics in-shop. Modern Interferometric testing and evaluation offers many positive attributes and capabilities that were unrealized or not previously considered when testing range optical systems. Today's advanced, portable and highly accurate optical test equipment such as the Laser Unequal Path Interferometer (LUPI) and interferometry and analysis software now provide for useful, meaningful and highly accurate data collection and analysis. Optical analysis software can provide measurements to accuracies of billionths of a meter on interferometric data in seconds, which not long ago could take days or even months. A comprehensive set of important parameters that affect optical imagery and resolution can include coma, astigmatism, focus, peak-to-valley, spherical distortion, resolution/Modulation Transfer Function (MTF), and RMS. One of the most useful optical parameters now available in the suite of test parameters is the MTF curve. This datum can provide information to a much higher degree of accuracy and without the inherent subjectivity derived through the use of the 1951 Air Force Resolution Target.

DETAILED DESCRIPTION OF AN EMBODIMENT

Figure 1:
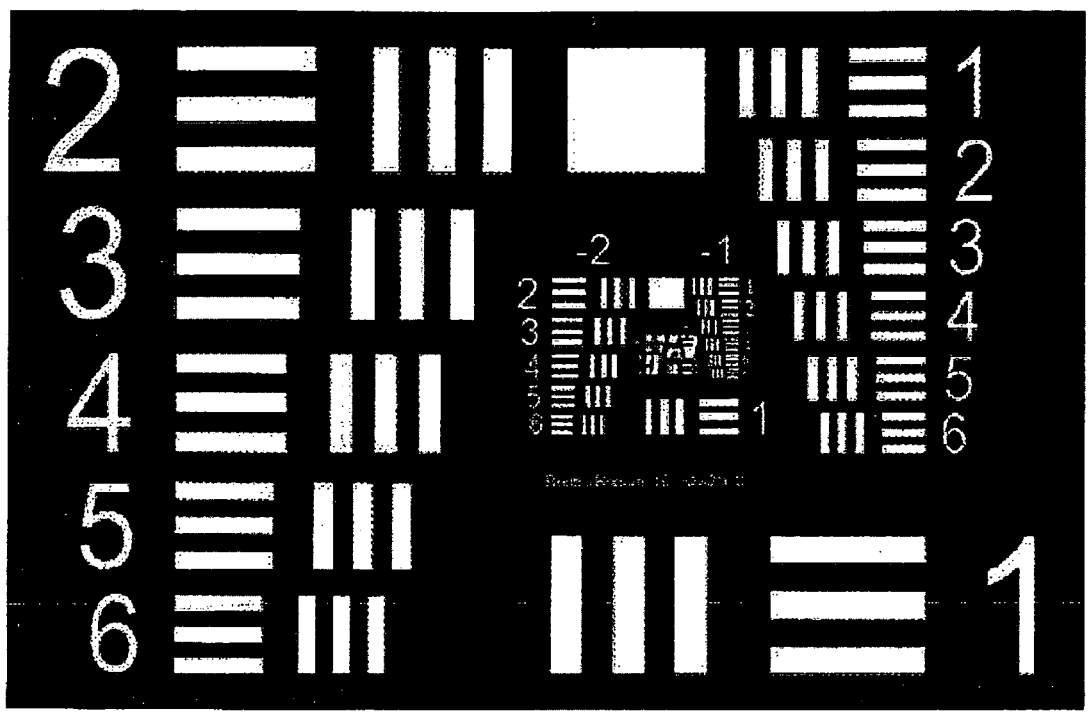
FIG. 1 is a prior art resolution test target.
Figure 2:
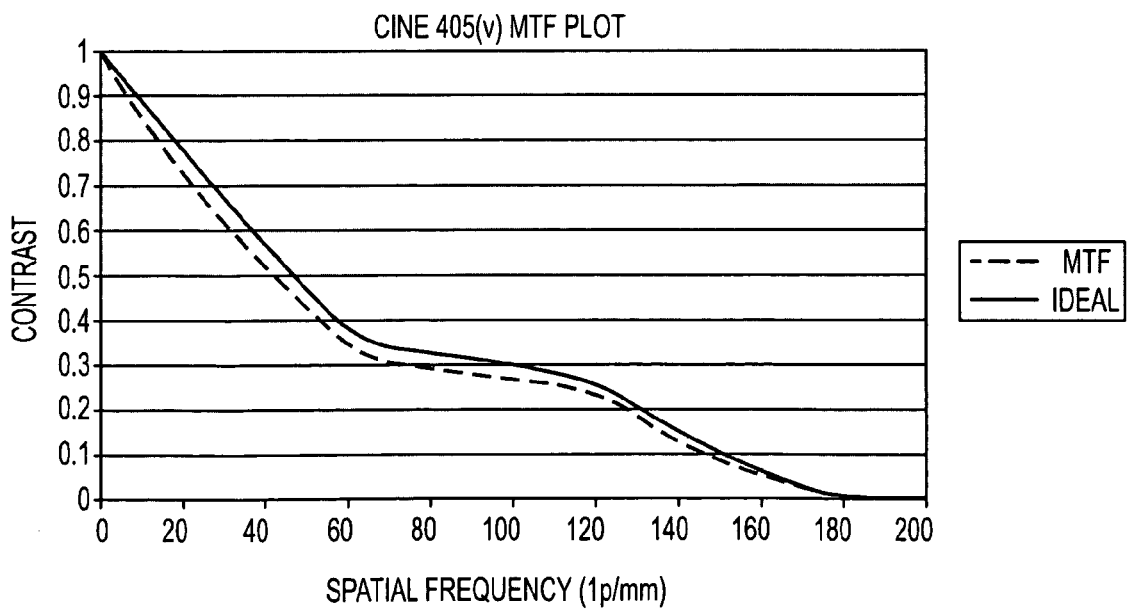
FIG. 2 is a graph of a modulation transfer function graph.

A much better way of obtaining test information with the highest degree of accuracy is to forgo the use of the 1951 AF Resolution target and replace it with modern interferometry and the MTF graph of FIG. 2. The MTF is a known method of evaluating the contrast—or modulation—of an image (sometimes a squared periodic grating) before and after passing through an optical system. In its simplest terms, the modulation can be defined as a mathematical relationship between maximum and minimum luminance values either detected or actually in the light and dark portions of square wave periodic grating. A non-limiting example might be (light portion luminance−dark portion luminance)/(light portion luminance+dark portion luminance). Other alternative mathematical relationships can be envisioned and could also suffice. As shown in FIG. 2, the MTF is expressed as a ratio of the contrast (modulation) in a detected image (after passing through the optical system) and an original image. That is, due to imperfections and other errors, the optical system can be expected to pass a lesser perceptible difference in luminance between the light and dark portions of a square wave periodic grating that actually exists in the original image of the square wave periodic grating. The ratio is the MTF, expressed on the y-axis of FIG. 2.

The MTF ratio will also be a function of the spatial frequency of the image. In the case of a square wave periodic grating, as the spatial frequency of the light and dark bars increases, the perceptibility of the contrasting bars is expected to diminish. The closer the bars are to each other, the less capable the optical system will be expected to display differences in luminance between them. The spatial frequency is shown on the x-axis of FIG. 2.

Newly available software enhancements can more objectively measure line pairs per millimeter relative to the Modulation Transfer Function (MTF) curve.

Figure 13:
FIG. 13 is an example menu page from the LabVIEW program used for the input of optical aberration values obtained from full wave interferometry.

An example software system that can be employed to evaluate the optical aberration data is LabVIEW Image Simulation Software. It can be programmed by the artisan, based on the details described in this disclosure, to provide software-based evaluation of the aberrations associated optical images. Labview is a programming tool available commercially from National Instruments that utilizes a graphical development environment. Labview introduces powerful features for developing measurement, analysis and display applications. It allows one to quickly ACQUIRE data from laboratory or field instruments then extract useful information from that data for ANALYSIS and PRESENTATION in useful graphs and charts. FIG. 13 shows the Front Panel of the Labview Image Simulation Software for providing input from the optical testing interferometer. It includes modeling parameters, telescope parameters, aberrations (or other test data, and object parameters). FIG. 13 is the menu page for input of the optical aberration values for the telescope as obtained by the full wave interferometric testing of the, for example, in-situ telescope.

Figure 12A:
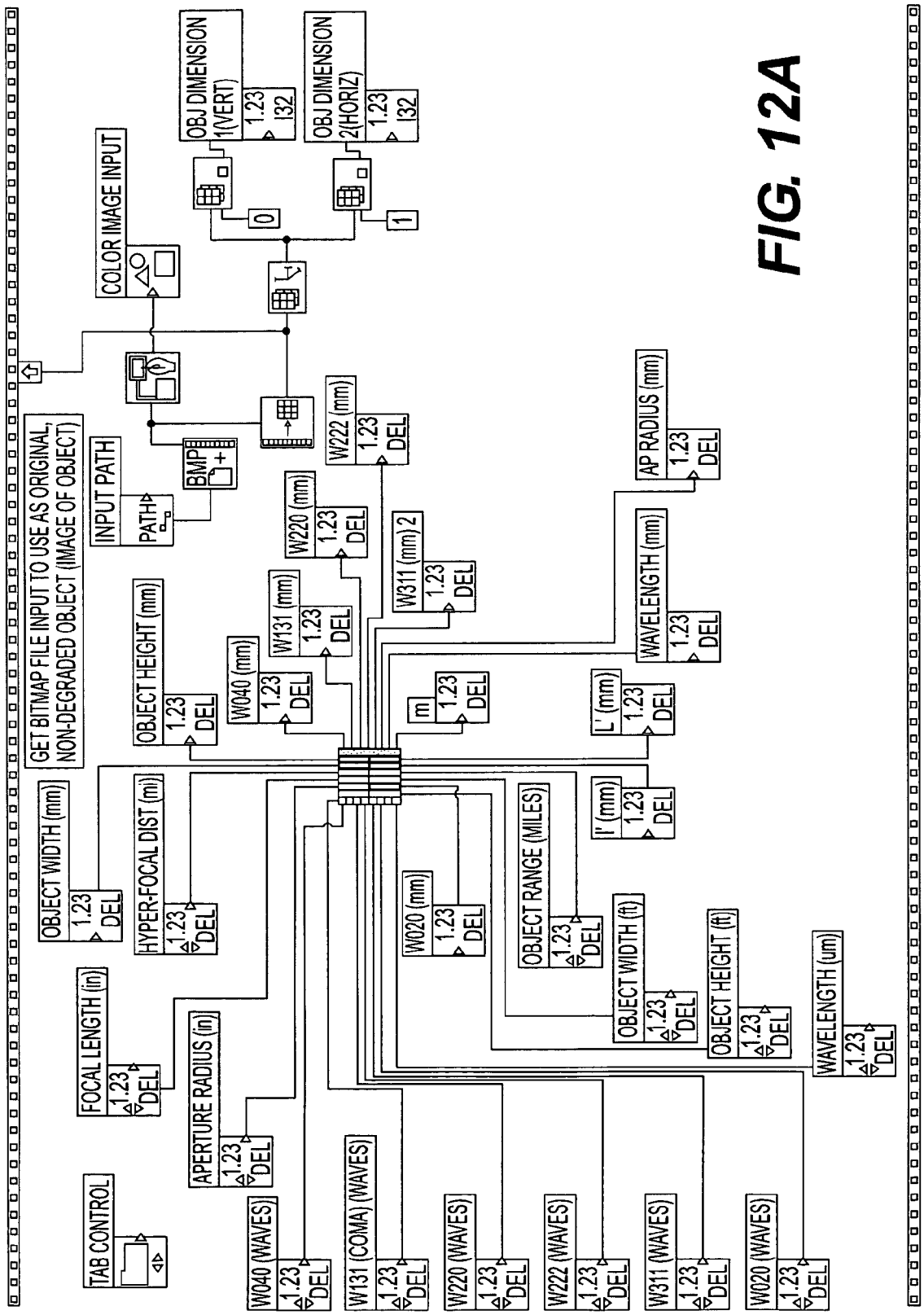
FIGS. 12a-12t are page shots from a LabVIEW program used in an example embodiment to perform the data acquisition and analysis.
Figure 12B:
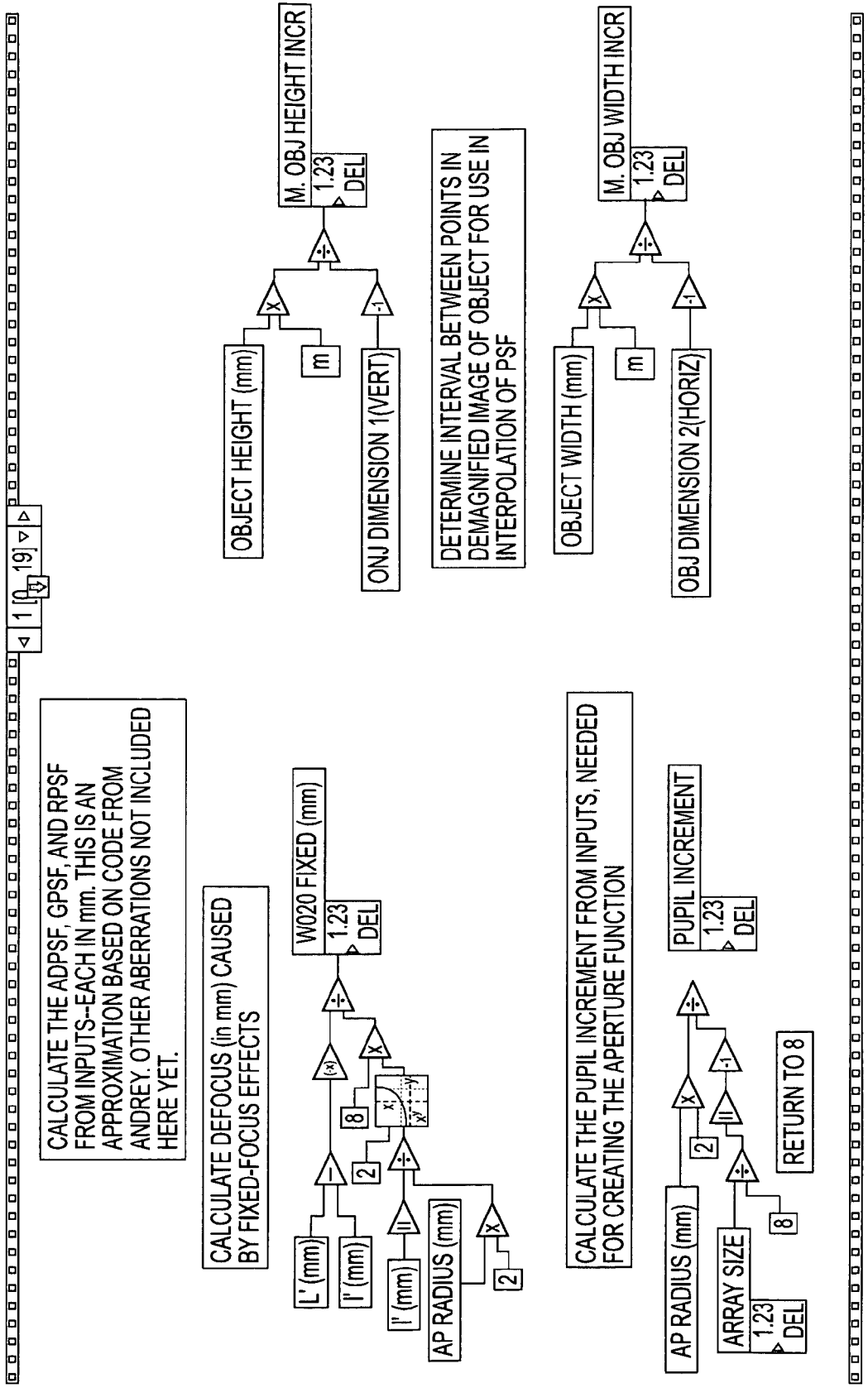
Figure 12C:
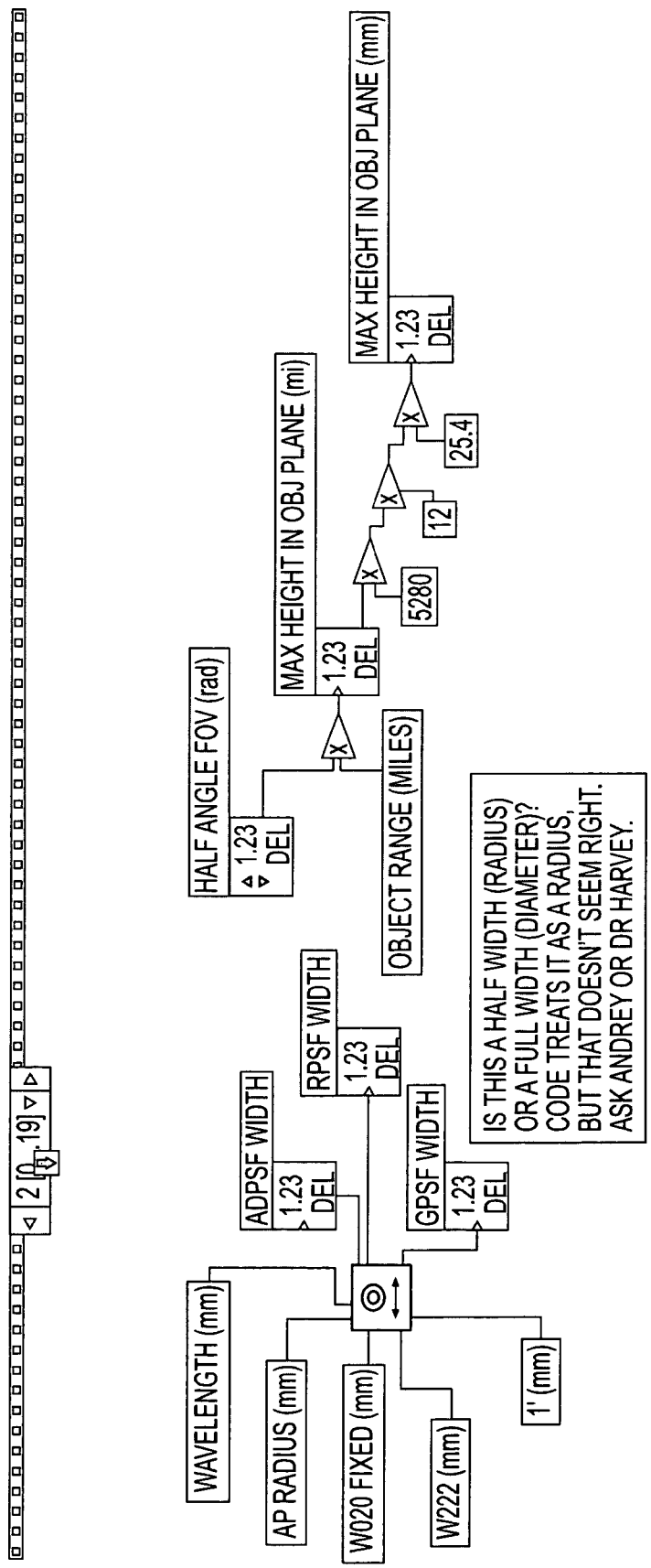
Figure 12D:
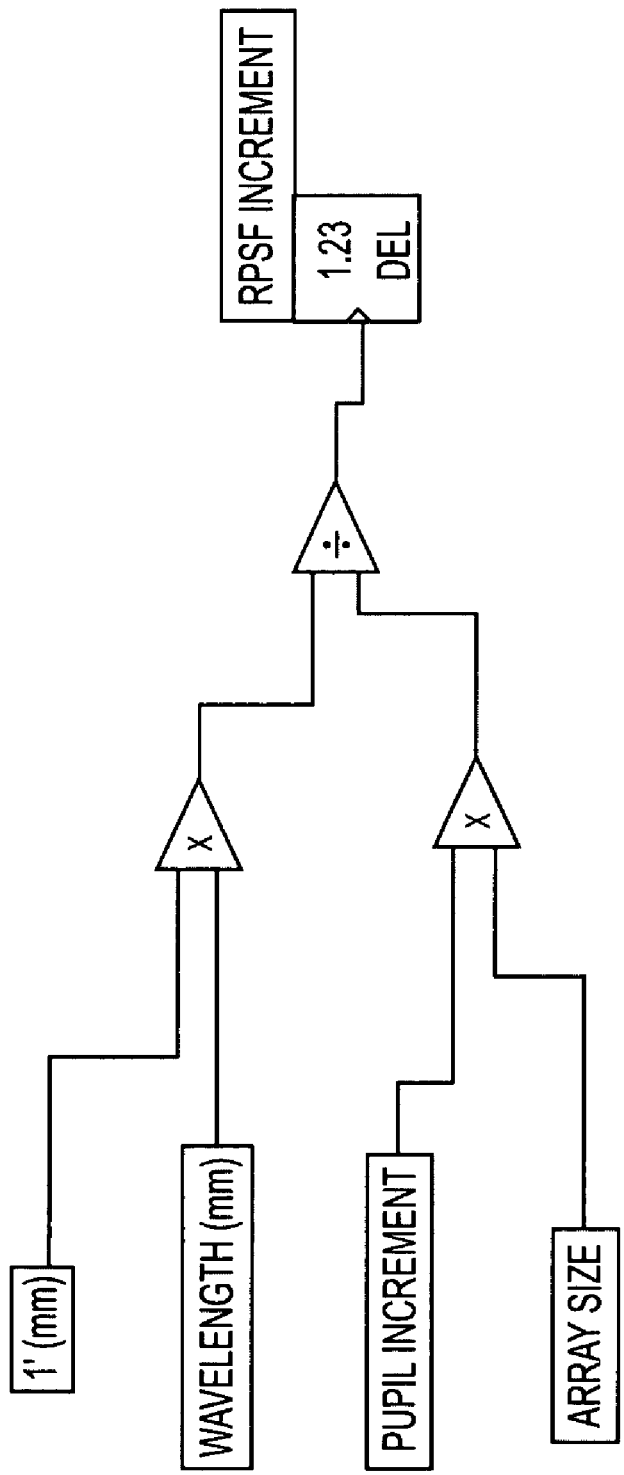
Figure 12E:
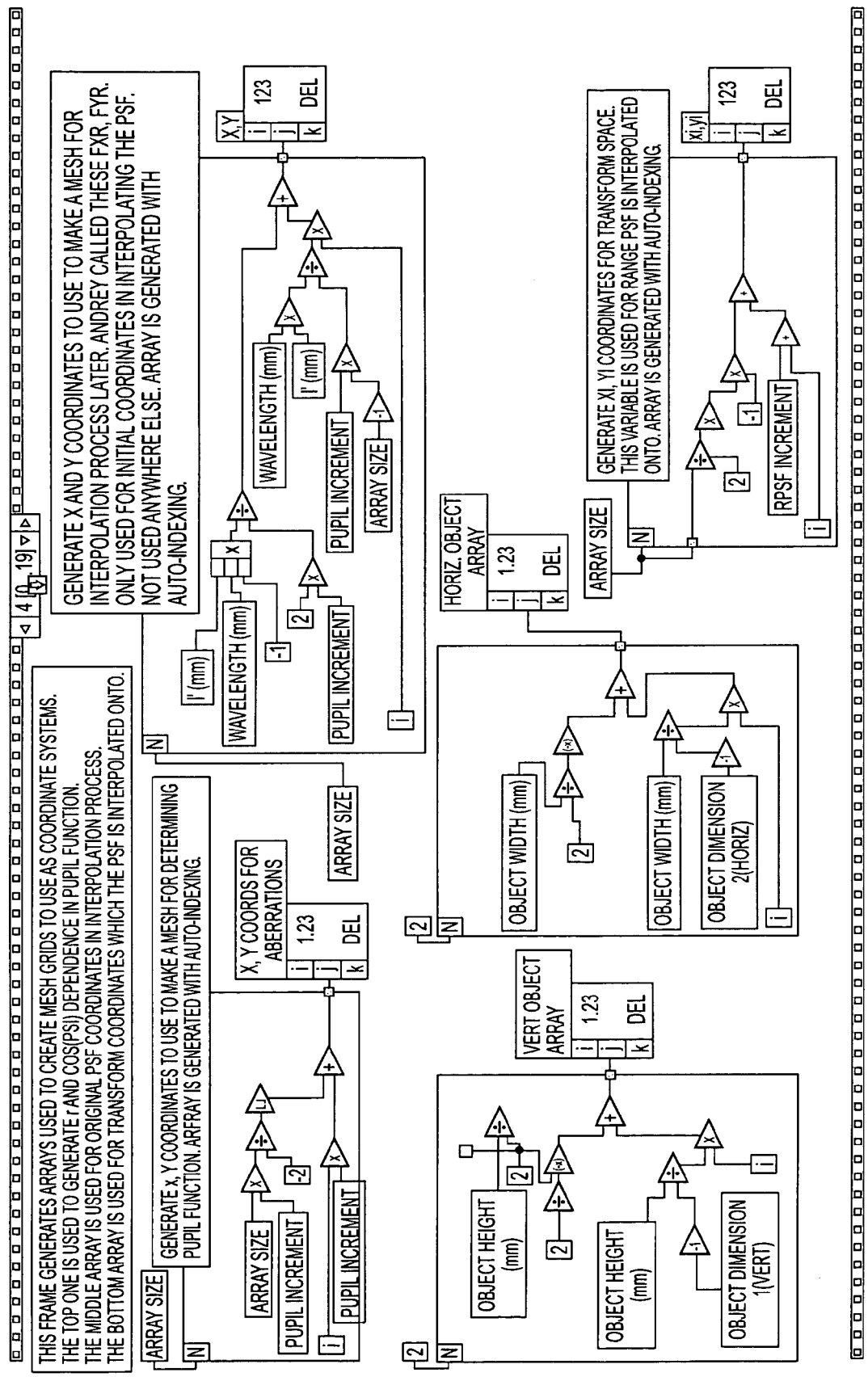
Figure 12F:
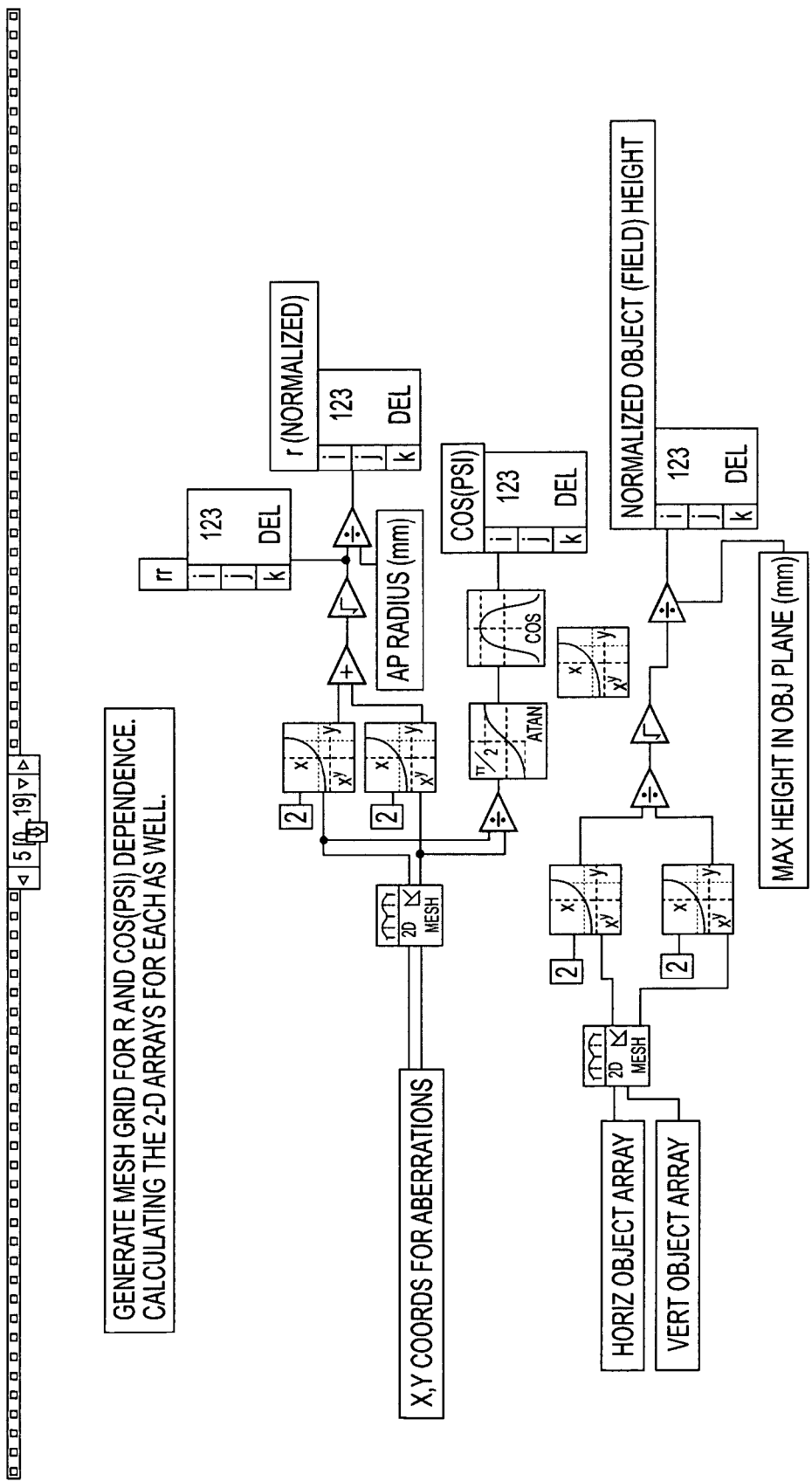
Figure 12G:
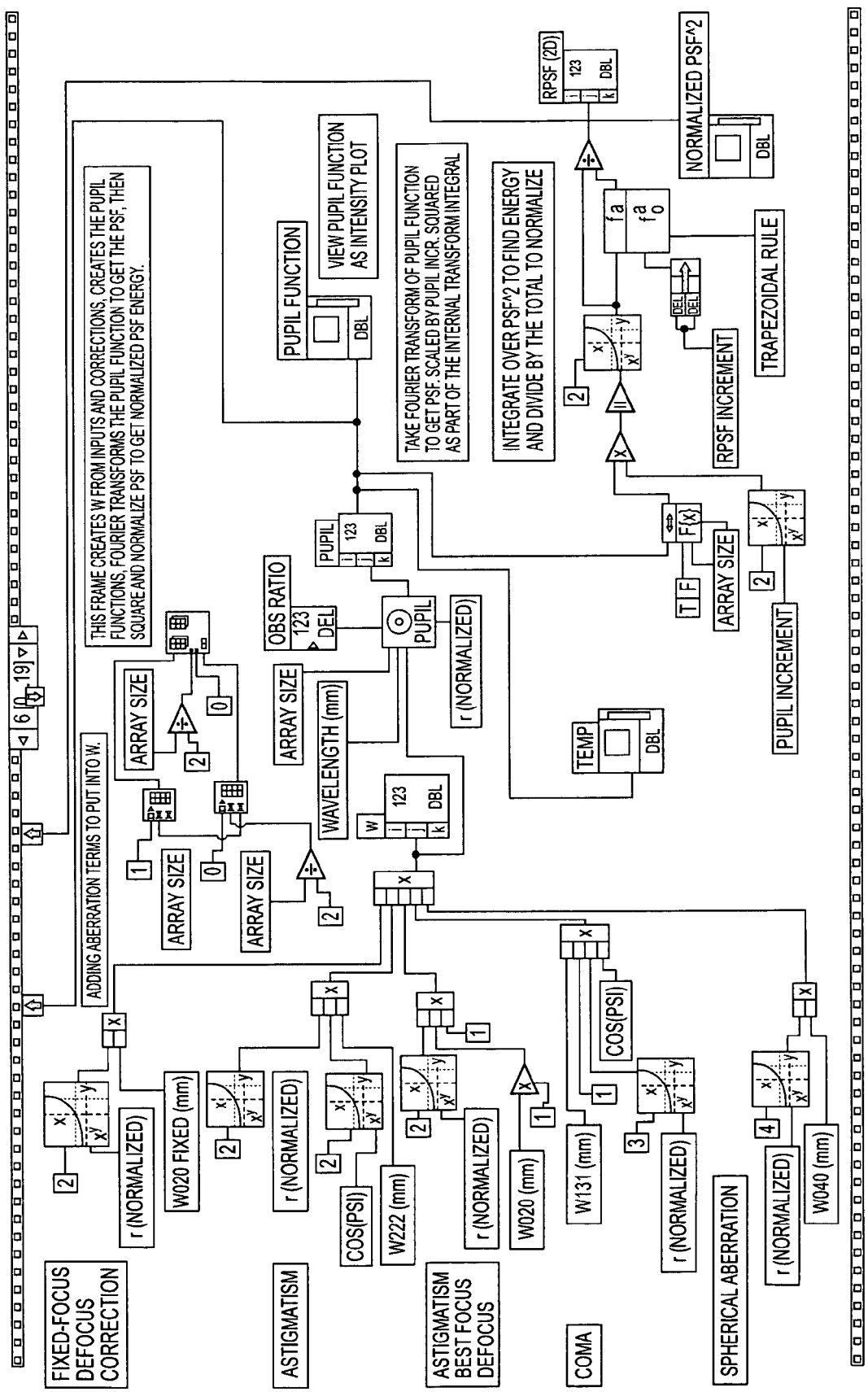
Figure 12H:
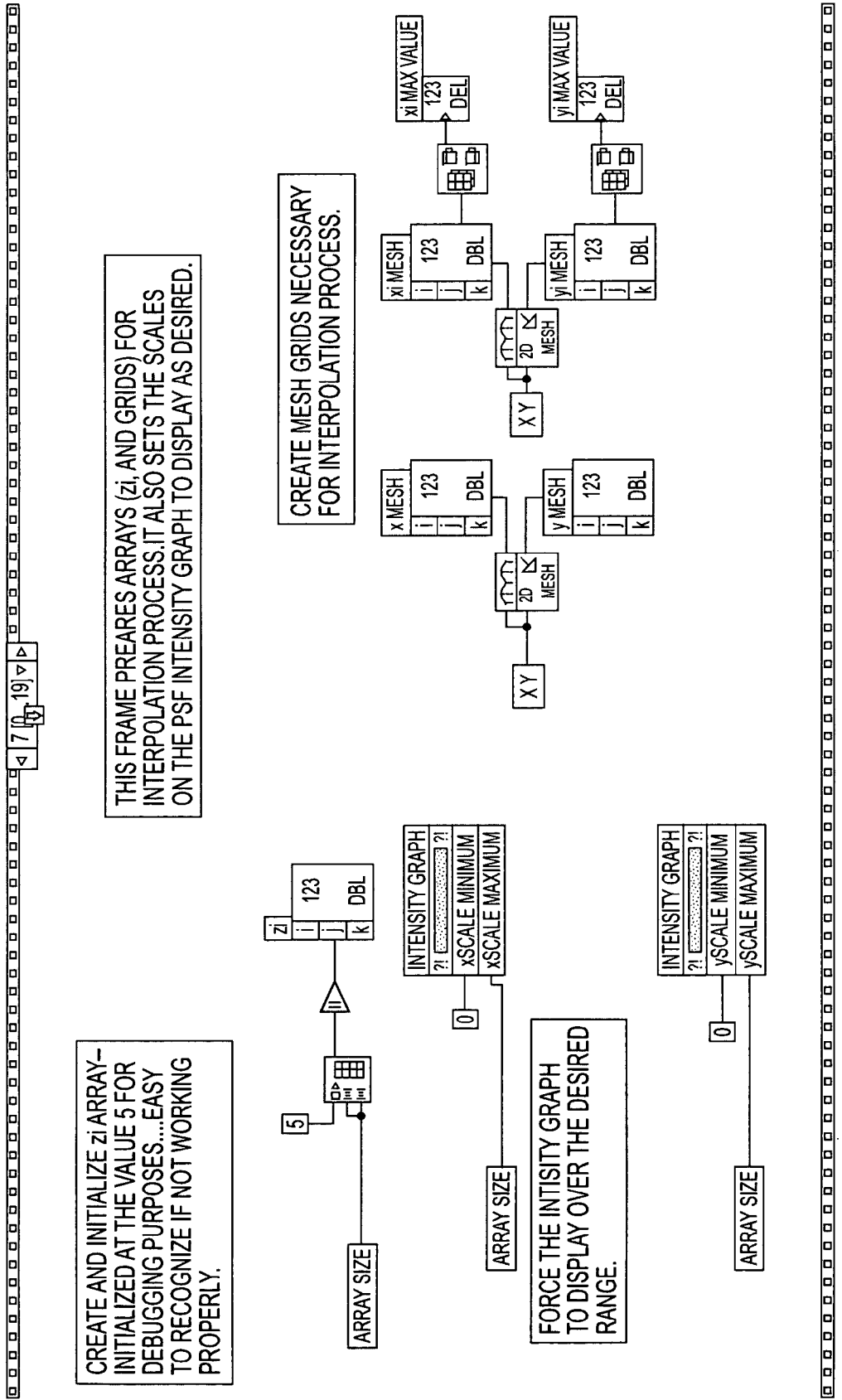
Figure 12I:
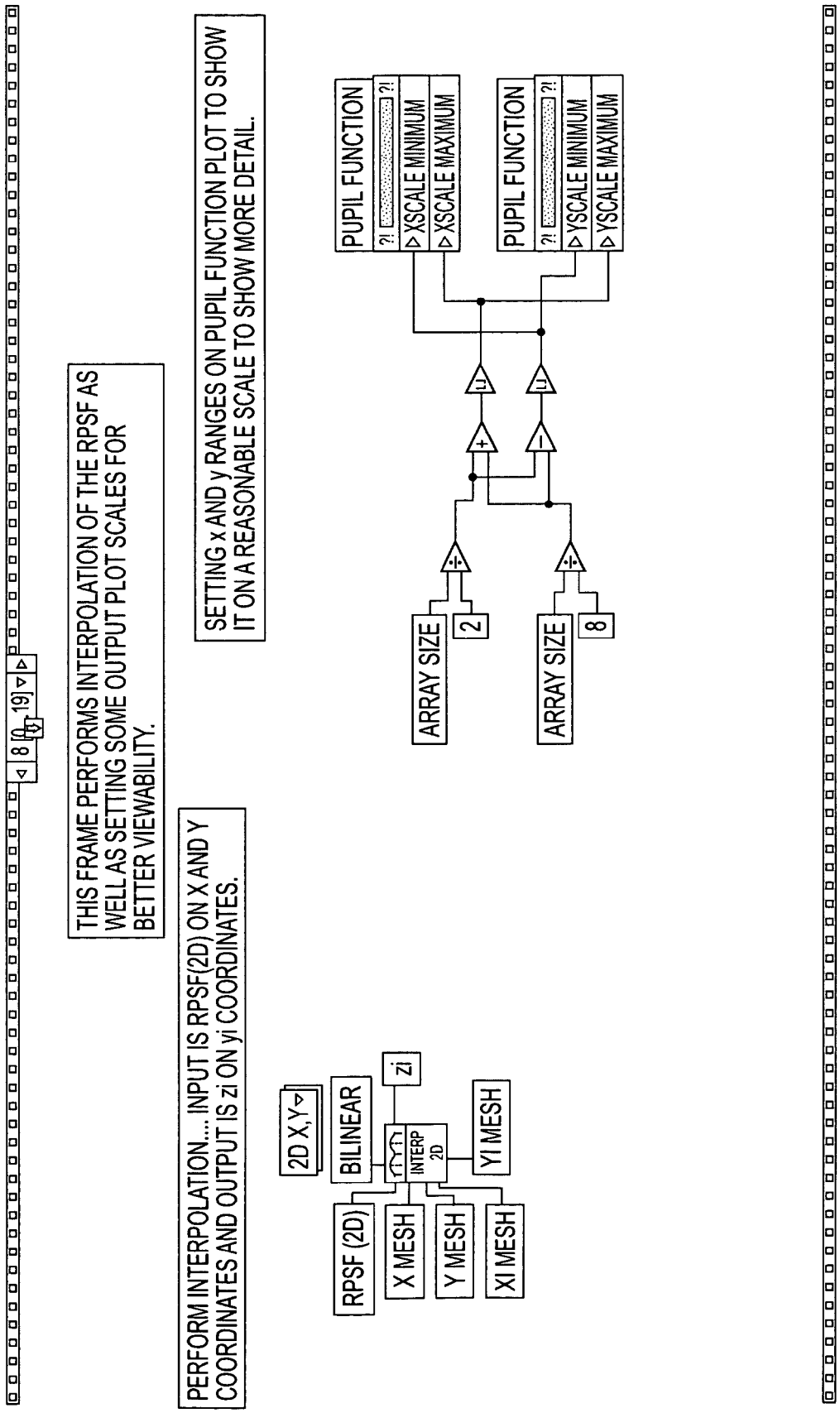
Figure 12J:
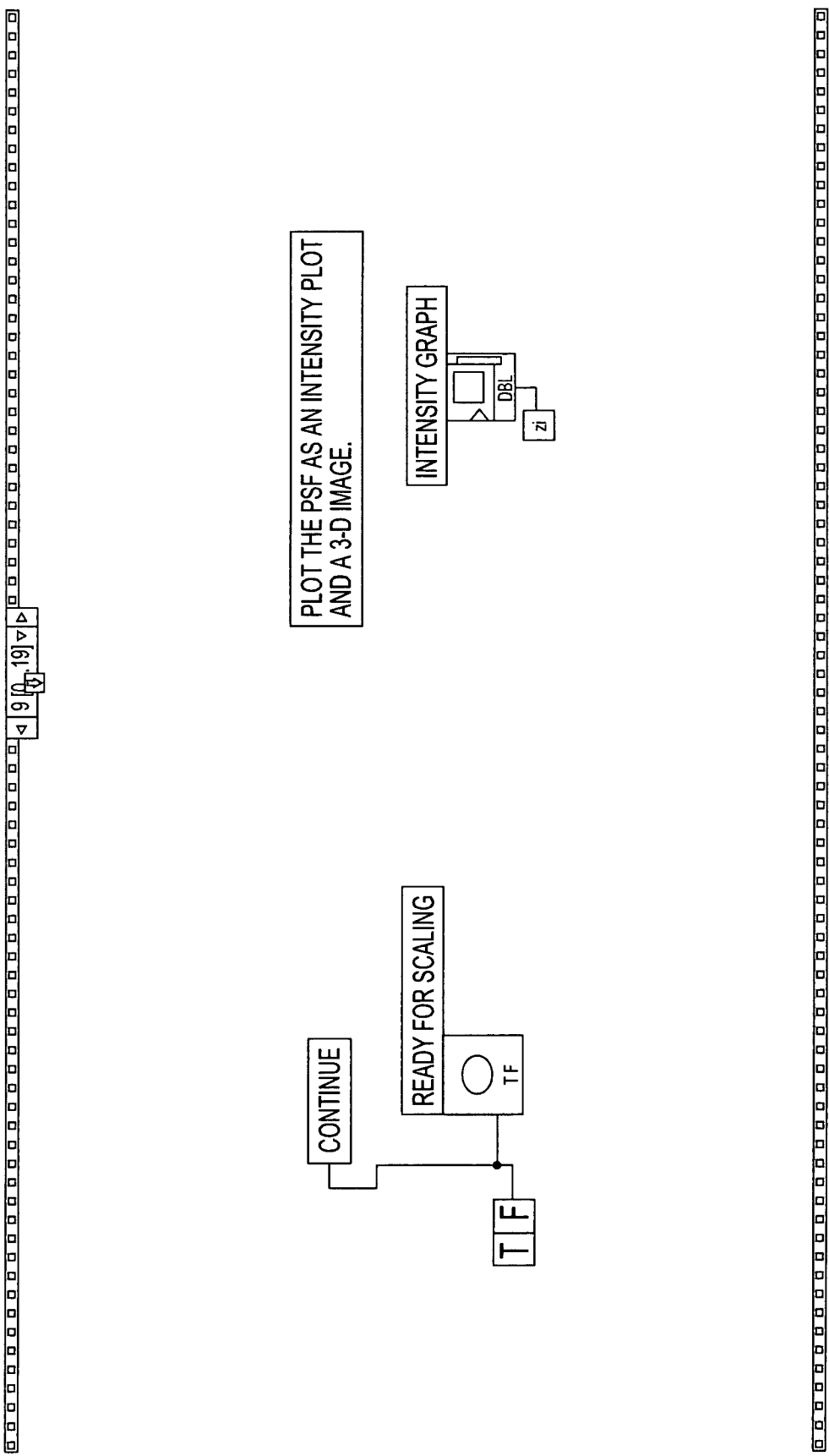
Figure 12K:
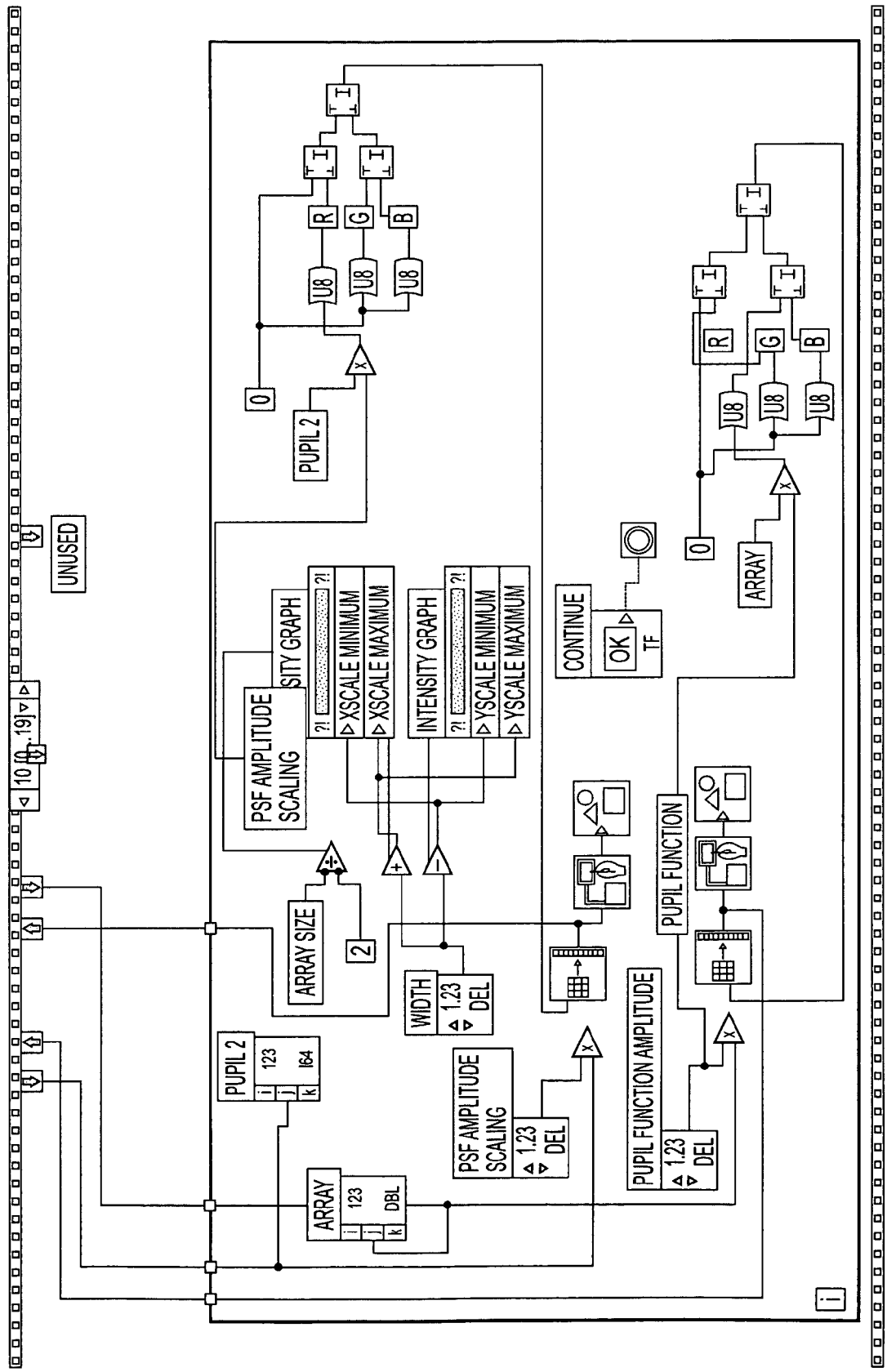
Figure 12L:
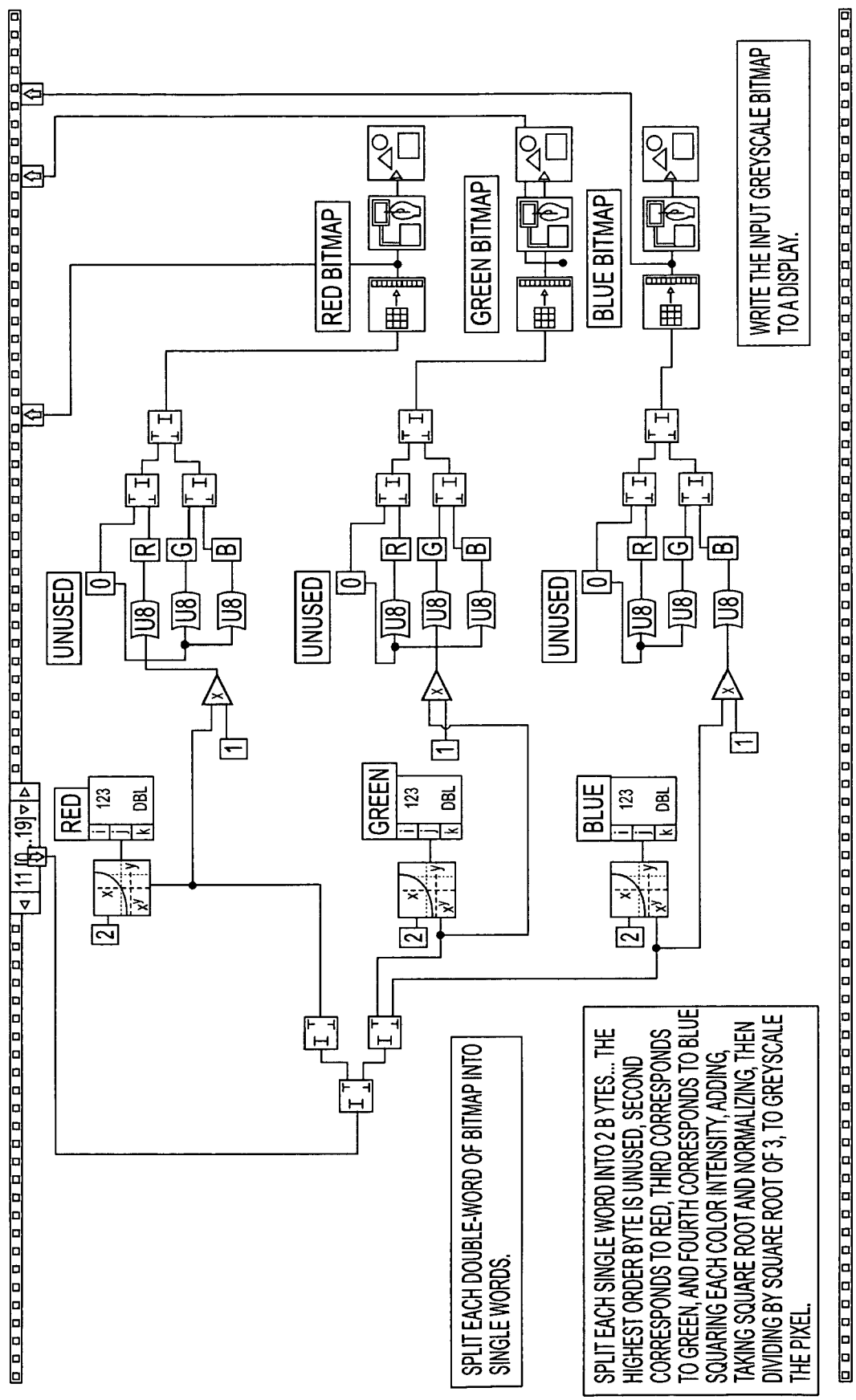
Figure 12M:
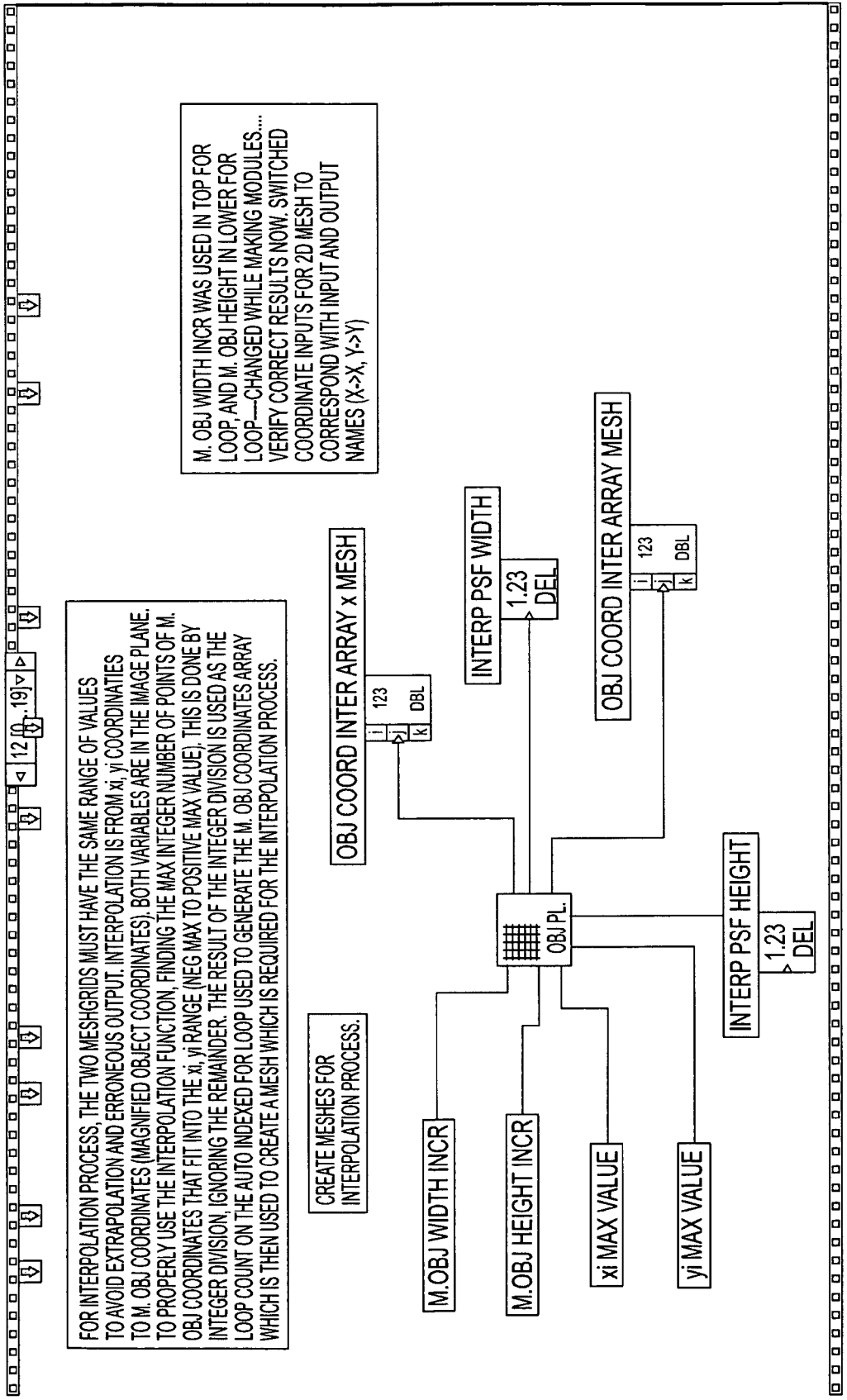
Figure 12N:
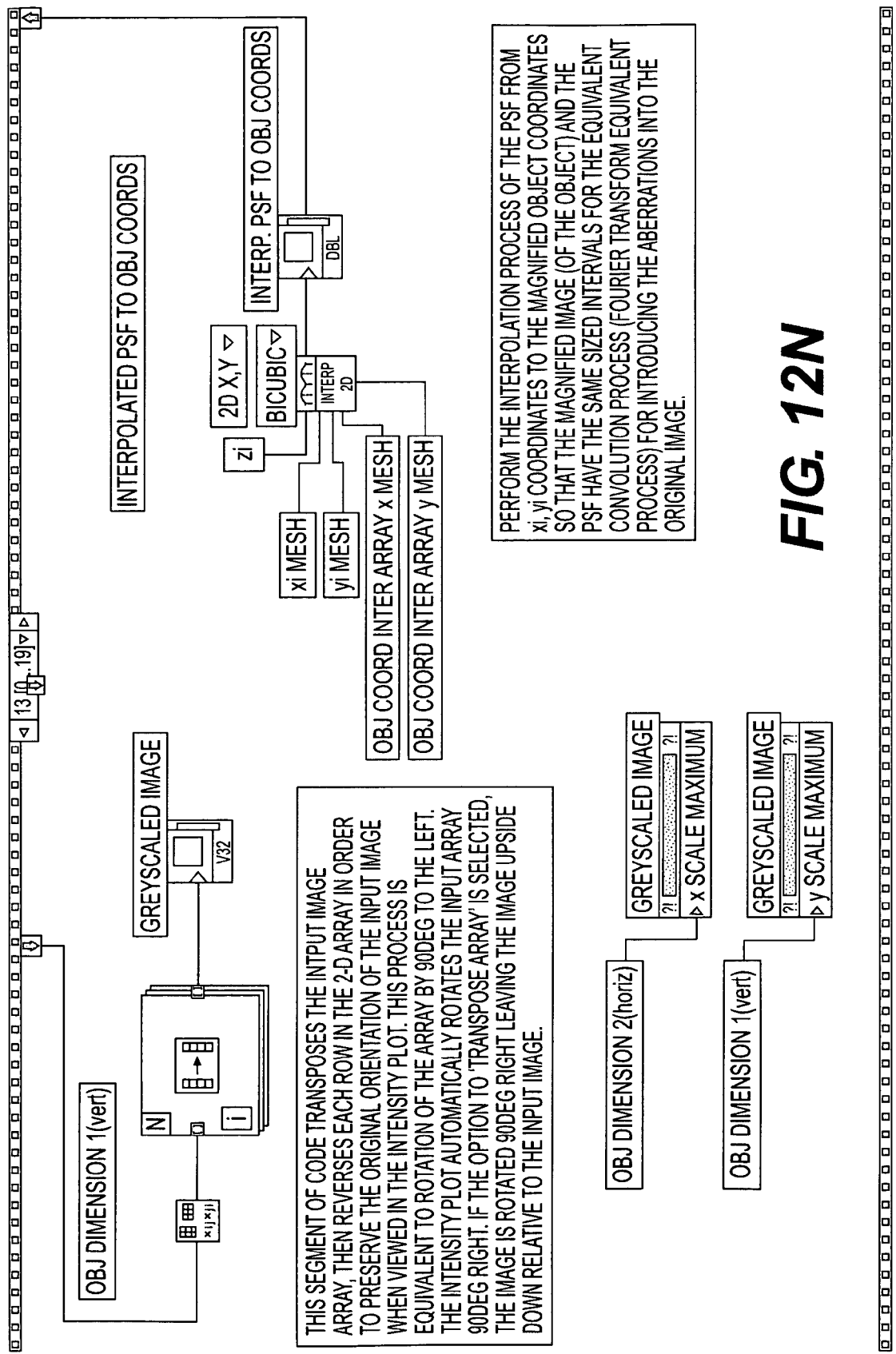
Figure 12O:
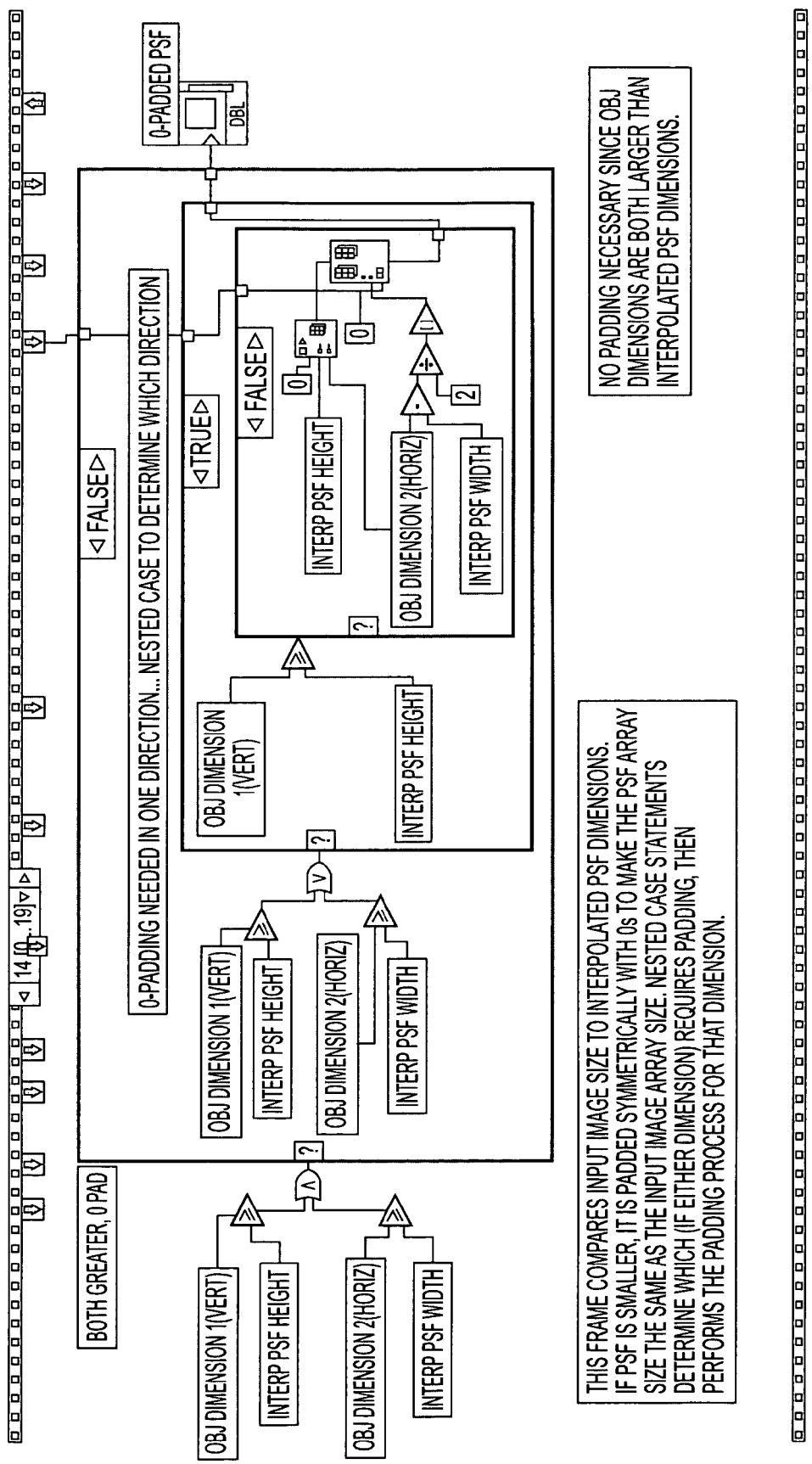
Figure 12P:
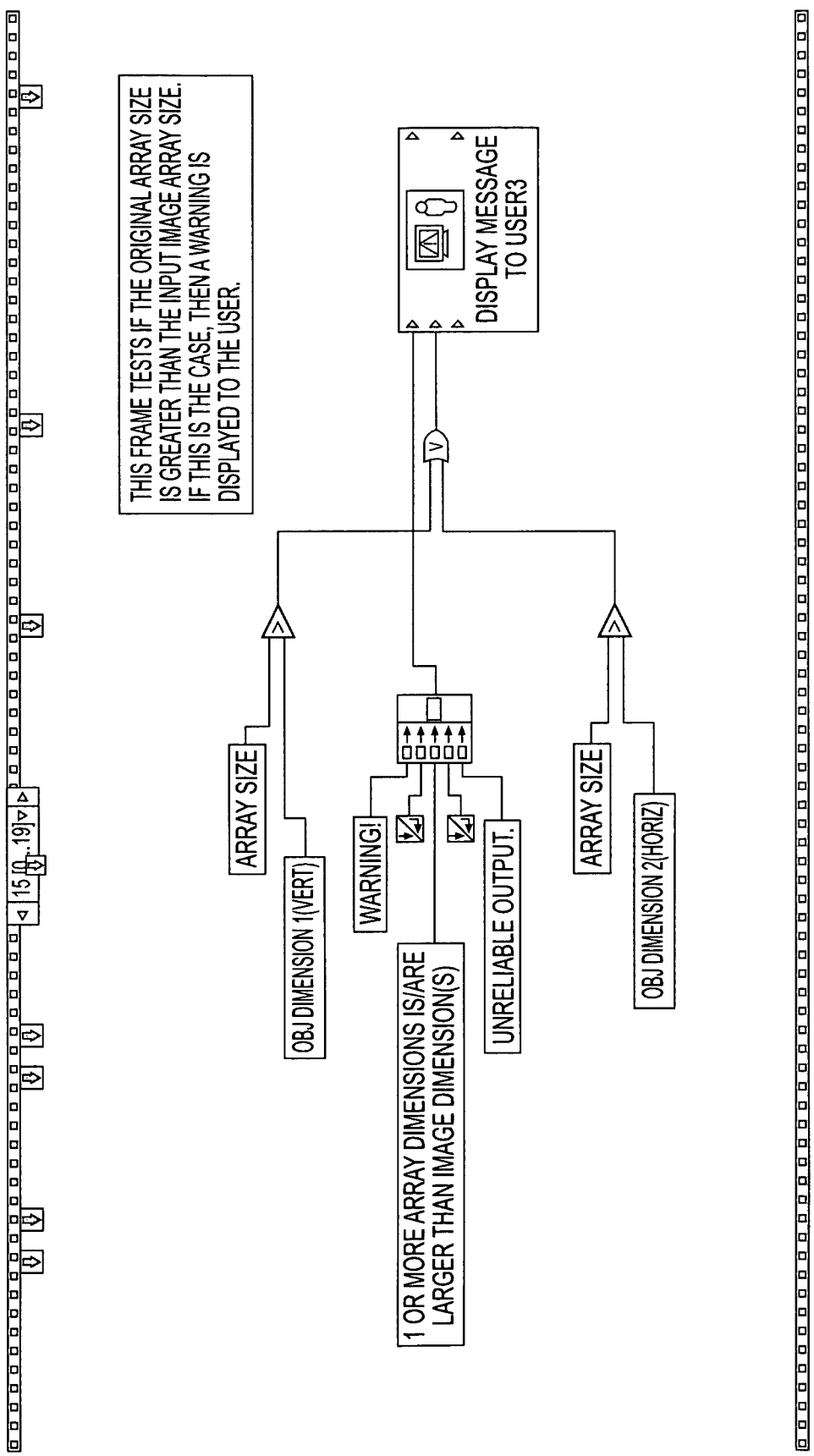
Figure 12Q:
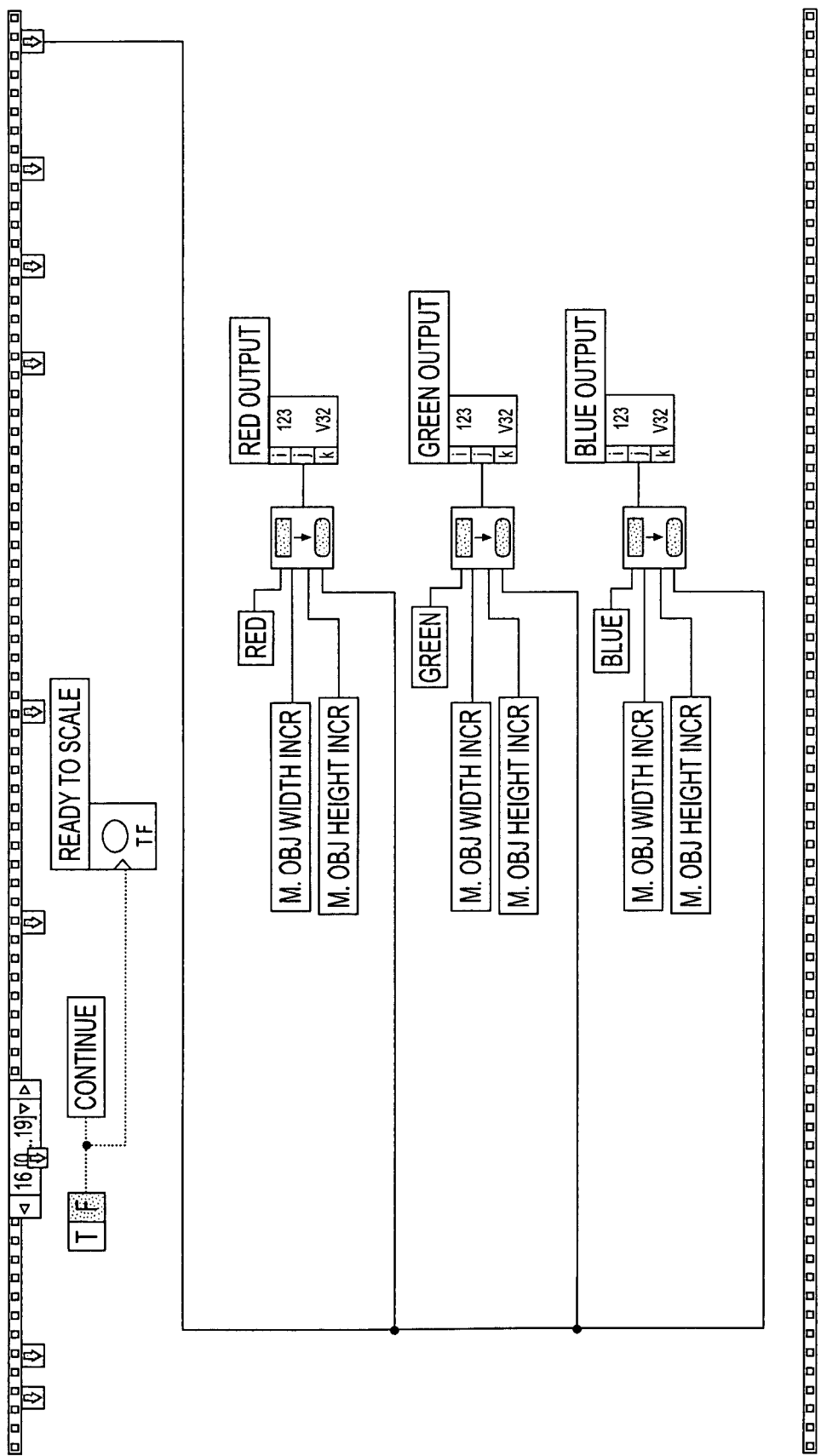
Figure 12R:
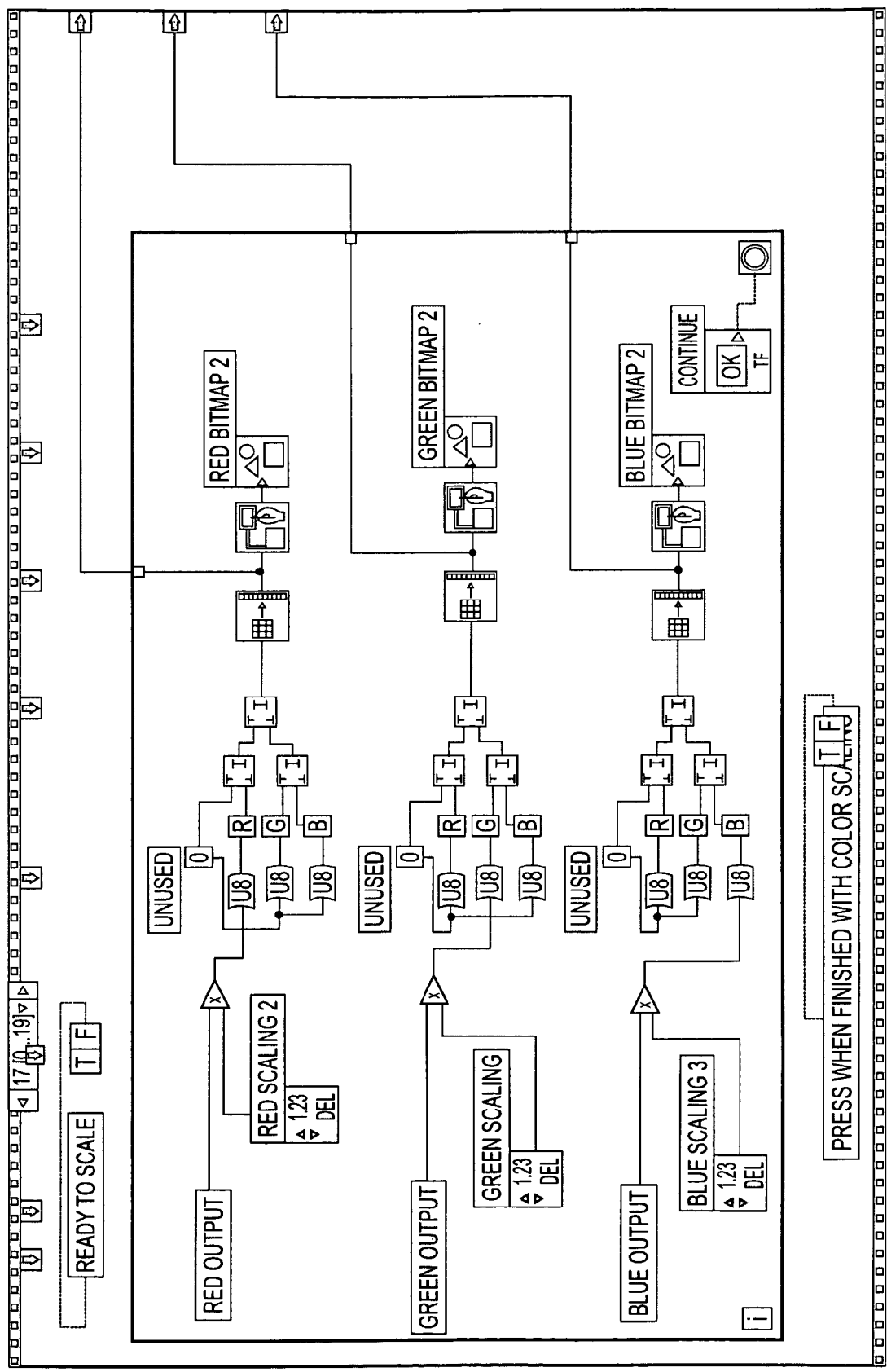
Figure 12S:
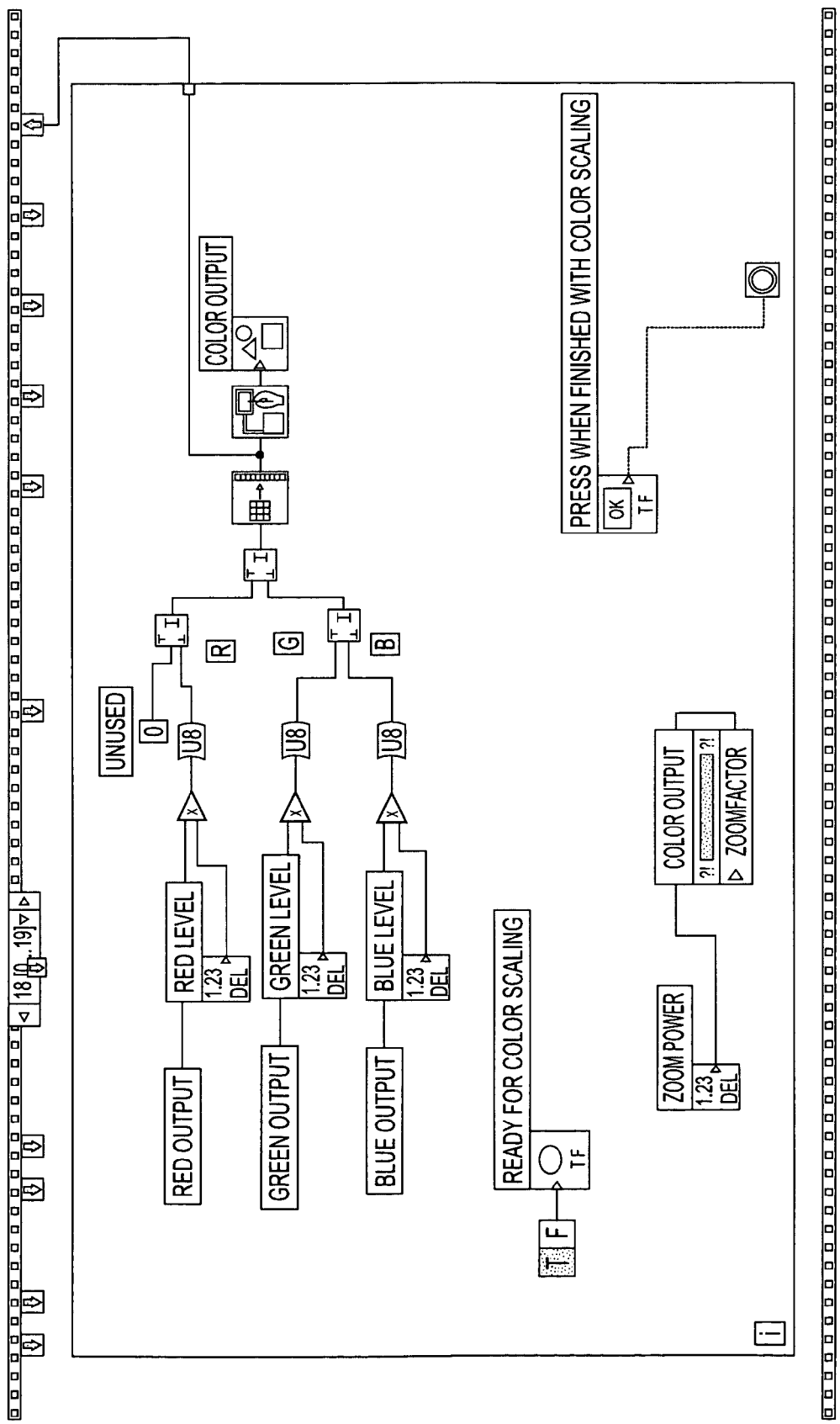
Figure 12T:
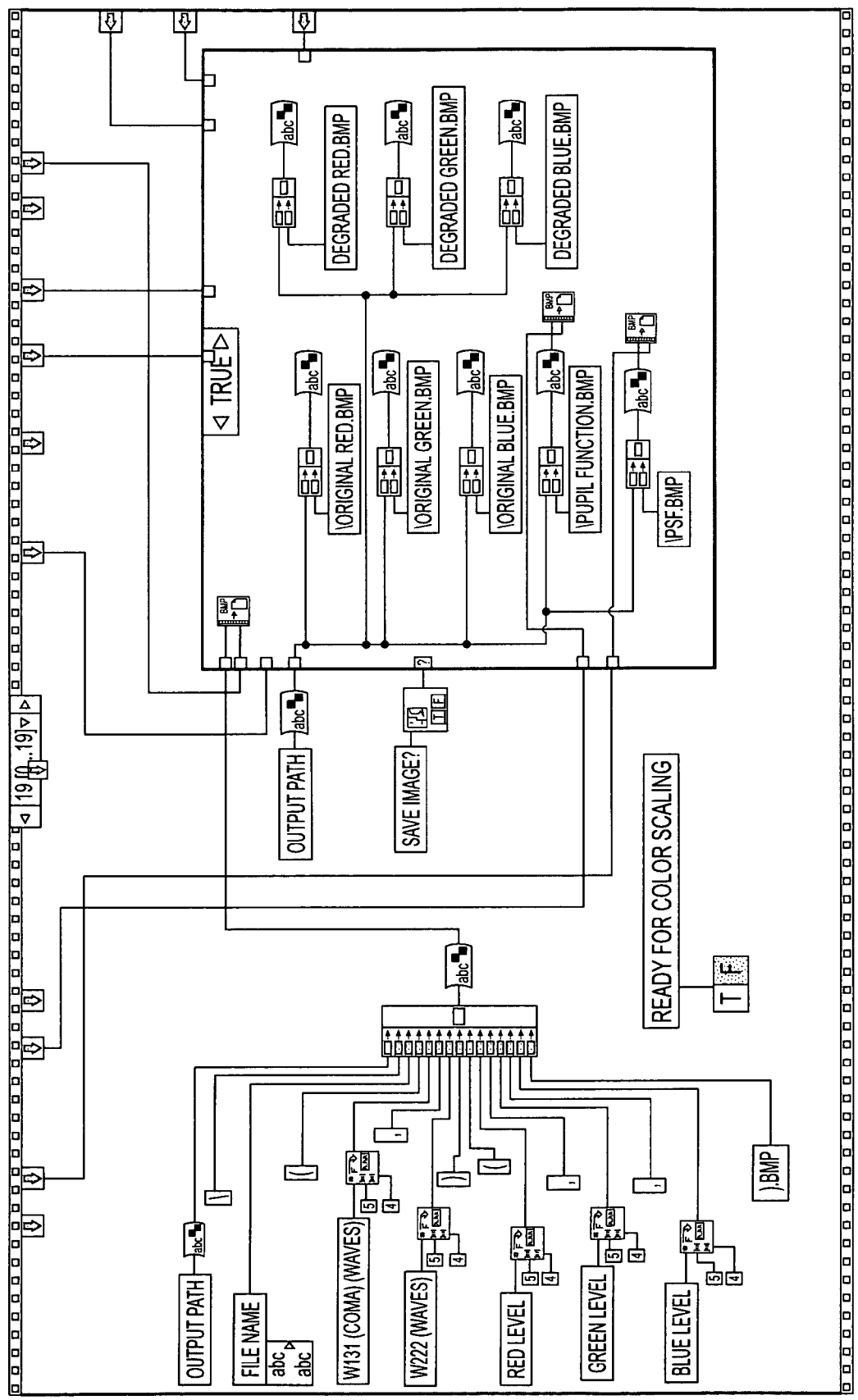

The Labview code is organized in a sequential form, each frame of the sequence performing various operations. It is similar to a graphical top-down programming format in that frames must be sequentially executed to prevent data-dependency issues. Frames may contain parallel computations as long as no operations are performed on data being operated on by other functions within that same frame, thus creating the above mentioned data dependency issue. Screenshots of the frames comprising the entire simulation software are shown in FIGS. 12a-12t, including the in-line documentation being listed within each frame. There are twenty screenshots shown in FIGS. 12a-12t. The operation of the LabVIEW programming scheme will not be described herein, but is readily available to the user of the commercially available LabVIEW program. Suffice it to say that the way the interactive symbols are connected in the Figures is the instruction for the program. A Labview text format of the same software is also included in the CD-ROM appendix.

As described, the MTF curve is a measurement of the ability of an optical system to reproduce various levels of detail from the object (target) to the image of the target as shown by the degree of contrast in the image. Because the MTF curve is mathematically determined, based for example on the parameters of actual/detected luminance and spatial frequency, human interpretation and subjectivity are removed from the evaluation. The necessary test equipment also becomes smaller, more portable and easier to work with, and the equipment risk associated with removal and transportation efforts are mitigated. The data obtained from this method is more accurate than can be achieved with the 1951 resolution target and all subjectivity is removed from the effort.

Interferometry can also provide a more comprehensive and objective characterization of optical aberrations associated with telescope performance through the use of modern optical software that defines coma, astigmatism, spherical distortion, Peak to Valley, RMS, focus and resolution. Despite these advances no tool presently exists that has the capability of objectively defining the visual effect of telescopic optical aberrations on images captured by photonic equipment. The TIME tool provides this capability.

The TIME tool is a software based package that provides a user-friendly input interface. It utilizes a telescope's interferometrically derived optical aberrational parameters and devolves a standardized image based on the value of those parameters. It then compares that image against an optimum diffraction limited image. The TIME tool software considers the optical aberrational parameters of astigmatism, coma, spherical distortion, Peak to Valley, RMS, focus and MTF resolution. These aberrational values can be manually altered and the effect can be observed on an image. This tool will enable the end user or maintenance provider a criterion by which they can objectively qualify the performance of their telescope or optical system and make programmed and predictive maintenance decisions for refurbishment or repair. It provides a user-friendly platform with a visual representation of an image and allows for the manipulation of optical parametric values with their resultant distortion of that image.

Figure 3:
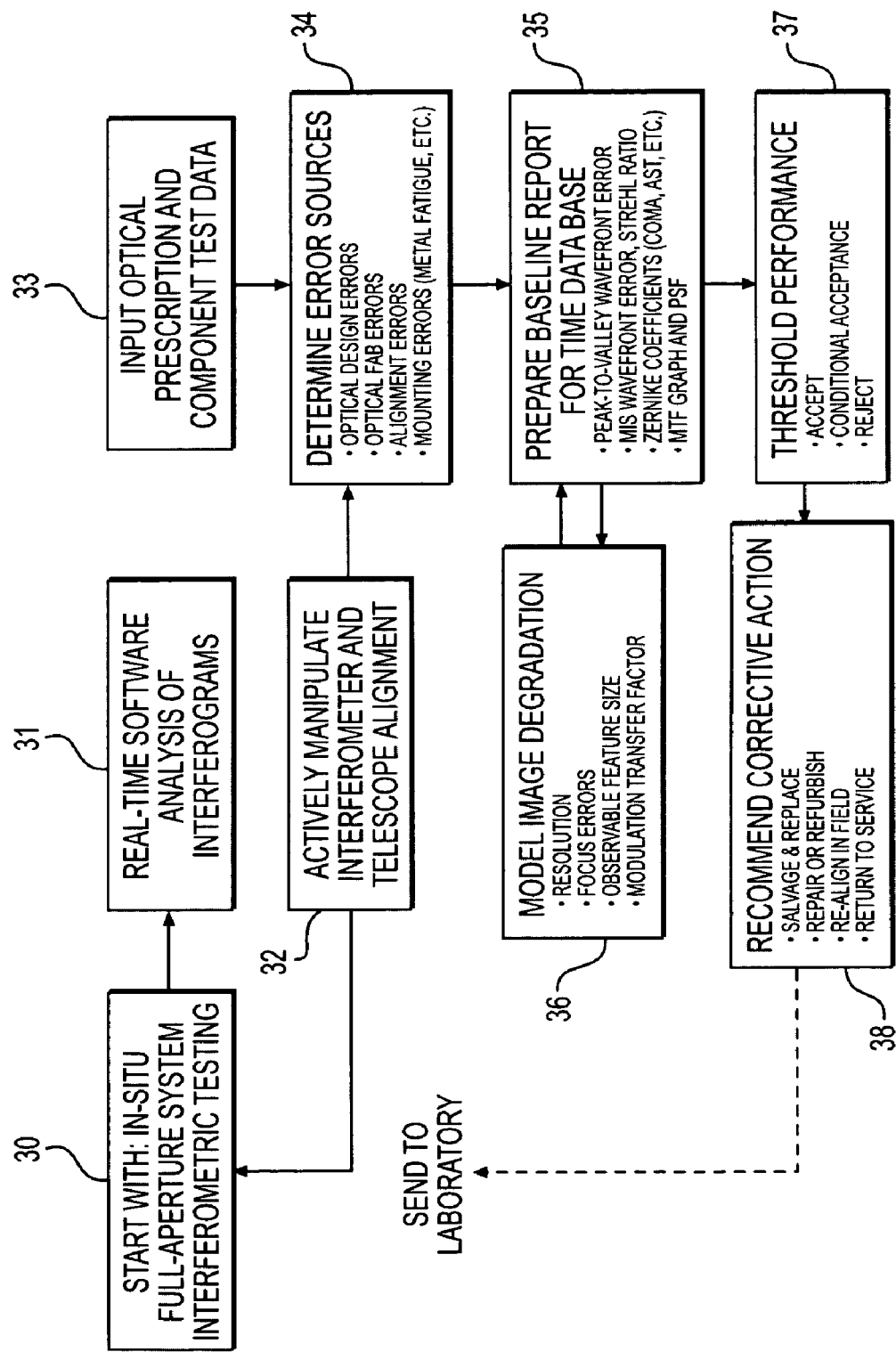
FIG. 3 is flowchart of an example TIME tool.

FIG. 3 shows a schematic diagram of the TIME tool. The process starts at step 30, with in-situ full-aperature system interferometric testing. An example test apparatus is described below with respect to FIGS. 9 and 10. This step makes the appropriate images needed for the analysis to follow in step 31. As described below with respect to FIG. 9, the test images include the image passing through the test optics, the associated interferogram, and the point spread function.

Figure 9:
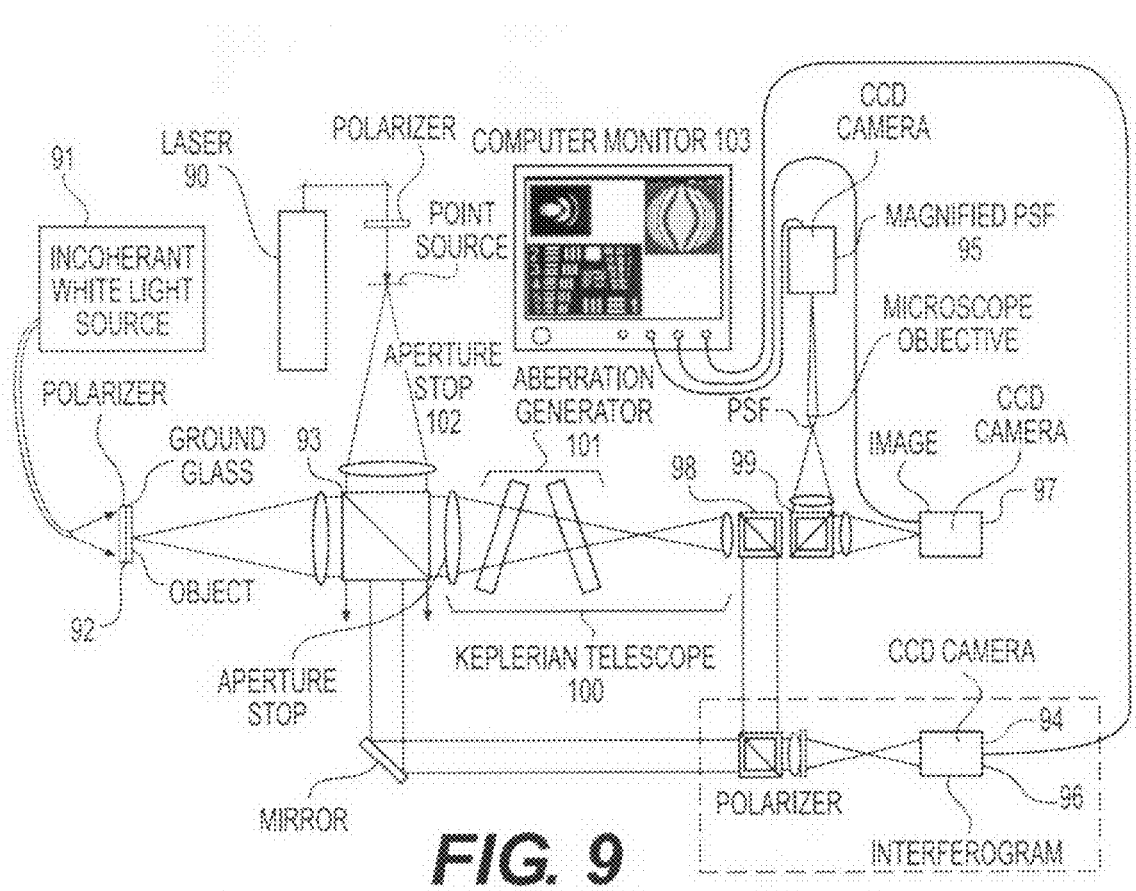
FIG. 9 is an schematic representation of an example TIME tool dual function experimental set up.

After the images are obtained by the test equipment of FIG. 9, at step 31 the system performs real-time analysis of the interferograms. The way that the interferograms are tested is not particularly described but may follow any of a number of known kinds of interferogram test methods. The artisan will be well aware of methods of representing the aberrations, distortions and contrasts exhibited in the perceived image based on the interferogram image.

At step 32, the interferometer and telescope alignment are actively manipulated to produce the best possible interferogram that is representative of minimal aberrational values.

Meanwhile, at step 33, optical prescription and component test data are input to step 34 where error sources are determined. The error sources may include optical design errors, optical fabrication errors, alignment errors, and mounting errors such as metal fatigue, etc. Information regarding detected alignment errors is employed to step 32 where the telescope alignment, for example, is actively manipulated.

At step 35 a baseline report for the TIME database is prepared. The report can include any of the kinds of interferometer measurements and quantifications known to the artisan. Peak-to-valley wavefront error, rms wavefront error, Strehl ratio, Zernike Coefficients (Coma, Astigmatism, etc.), MTF graph, and Point Spread Function (PSF) are just some examples. The choice of parameters and the weighting thereof are not particularly mandated, provided the parameters chosen and their weighting yield an objective report on the condition of the optics without the need for imprecise subjective evaluation. Those parameters and the methods employed to measure them or calculate them are known to the artisan, so only a brief description of each is described herein. For more information, attention is directed to "Basic Wavefront Aberration Theory for Optical Metrology" by J. Wyant, et. al. (1992), which is incorporated herein by reference. First, the peak-to-valley wavefront error reports on the maximum departure of the wavefront from the ideal but can be a less effective indicator than the rms wavefront error. Second, the Strehl ratio is a well-known calculation of the diffraction intensity of an aberrerated versus ideal wavefront. Next, Zernike coefficients are known parameters describing the aberration of optical images in the form of a sum of coefficients. Mathematicians have described these coefficients in the known literature and include such descriptions as bias, tilt, power, astigmatism, coma, primary spherical, trefoil, and so on. The next parameter, MTF, has been described already above. Finally, the Point Spread Function is a known form of three dimensionally depicting the aberrational differences between the representative image from the telescope and the known target image.

Figure 5:
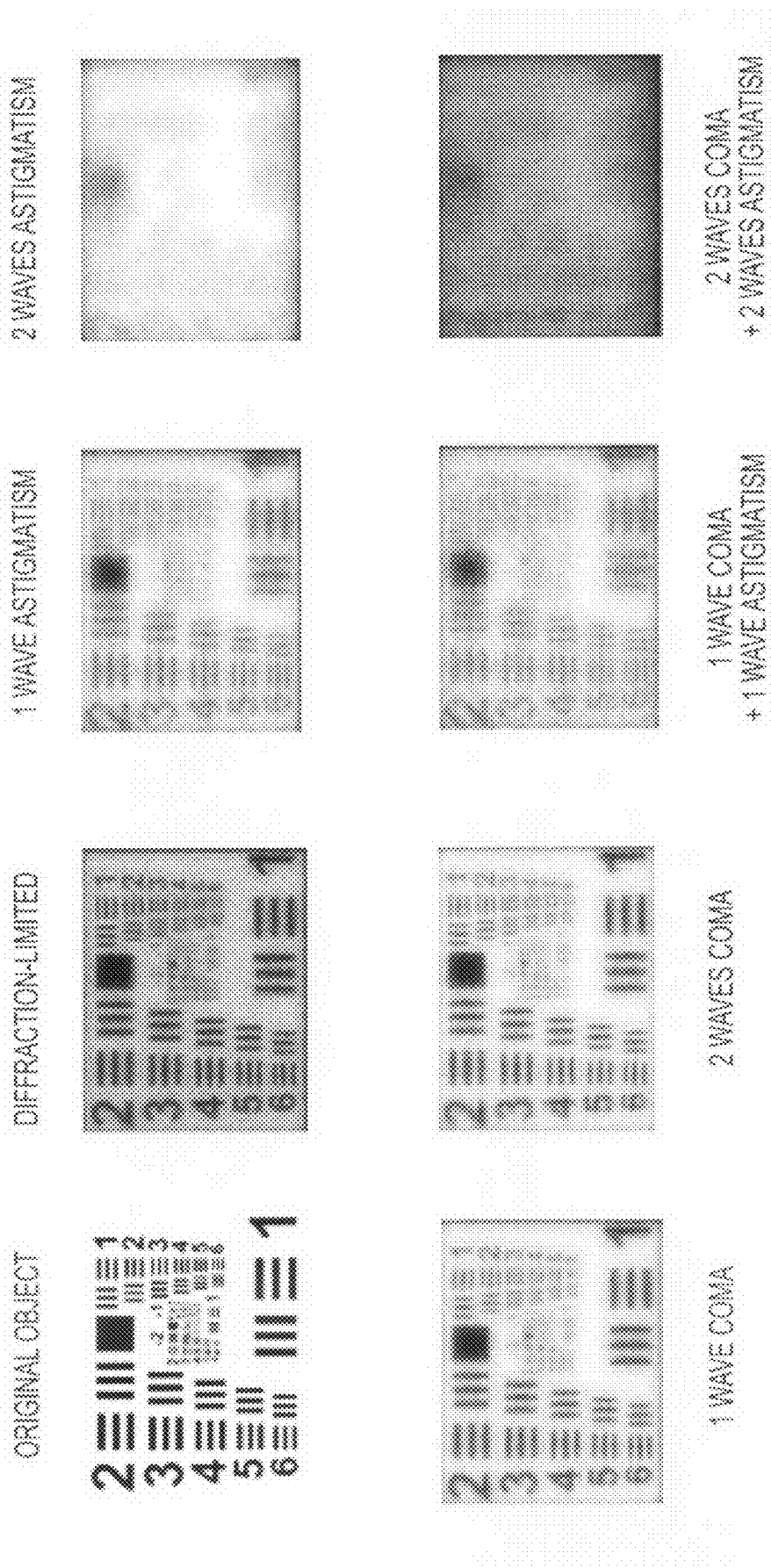
FIG. 5 is a simulation of an 3-bar Resolution Target with various aberrations.
Figure 6:
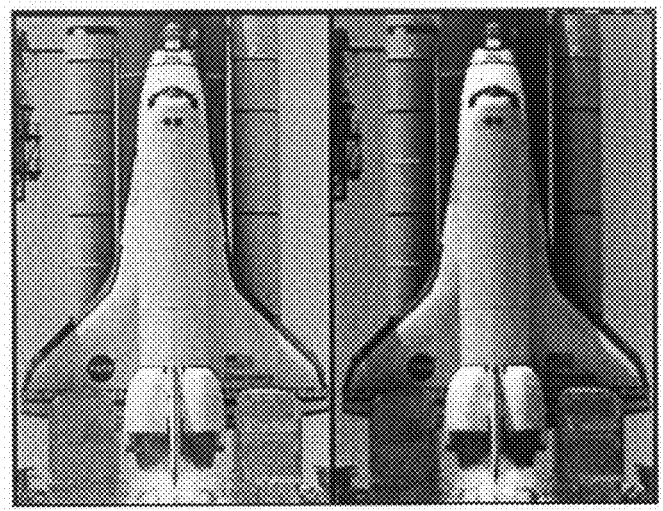
FIG. 6 is a simulation of image degradation due to diffraction.
Figure 7:
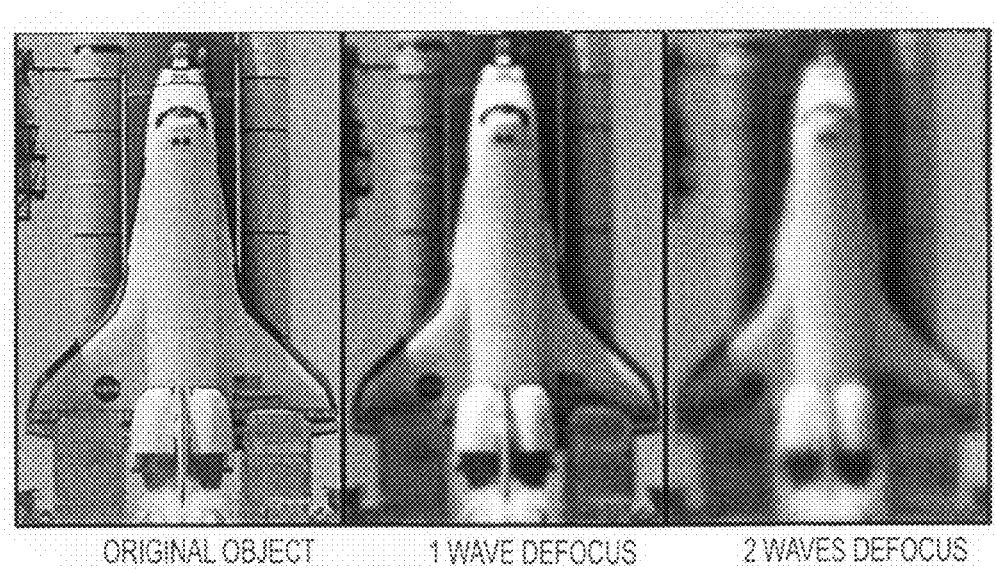
FIG. 7 is a simulation of image degradation due to defocus.
Figure 8:
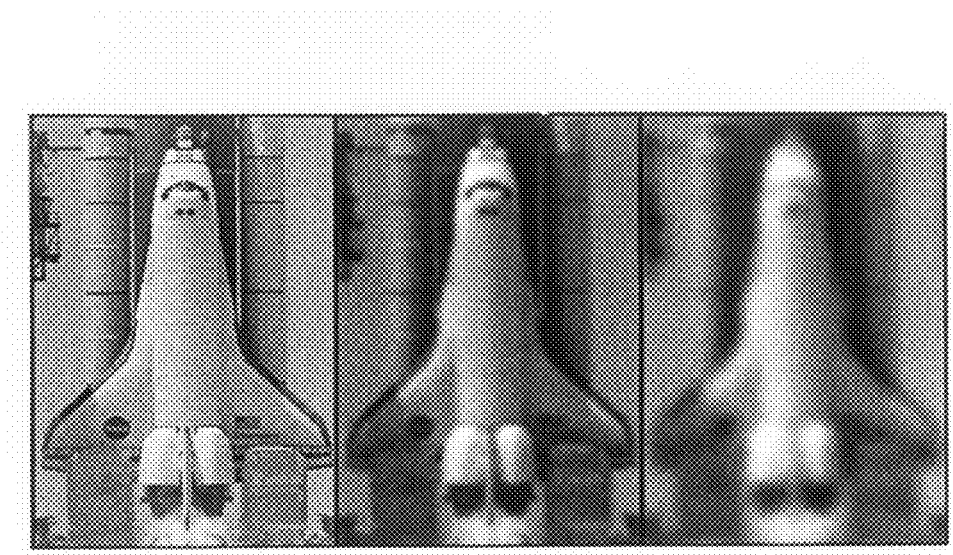
FIG. 8 is a simulation of image degradation due to spherical aberration.

FIG. 5 illustrates a simulation of some of the above-described aberration types in association with an image of the Air Force 3-bar target. As one can see, the different degradations of the original object are obvious, yet subjective distinctions and gradations may not be so. In the present embodiments, the subjective evaluation of the extent of degradation or aberration is in effect removed. FIG. 6 illustrates simulated image degradation caused solely by diffraction. FIG. 7 illustrates simulated image degradation caused solely by defocus. FIG. 8 illustrates simulated image degradation caused solely by Aberration (not balanced with defocus). As shown in FIG. 6, the telescope modeling parameters used on all of the images of FIGS. 6-8 shown were:

Aperature diameter: 18"
Focal Length: 400"
Wavelength: 550 nm
Fixed Focus Telescope
Obscuration Ratio: 0.473
Object Height: 122.2 ft.
Object Width: 78.1 ft.
Object Range: 45 miles As can been seen from FIGS. 6-8, subjective evaluation of the different degradation types and extent thereof is not readily obvious.

Returning to FIG. 3, the data base report is used in concert with step 36 to objectively model the image degradation including resolution, focus errors, observable feature size, and modulation transfer function. The threshold performance evaluation can also take into account a baseline of performance characteristics known for the actual optics at test. If the optics are in-field, the objective testing in view of a known baseline for the actual optics in-field is an advantageous feature because the environmental variations are the same for the optics in test compared to the environment in which the optics are actually employed.

Conclusions regarding the state of the optics are reached at steps 37 and 38, including a threshold performance rating at step 37 (accept, conditional accept, or reject). As an example, a threshold might be set at a quarter-wavelength of aberration, which might be the extent of "acceptance." That, however, is simply an example, and many other kinds of thresholds can be envisioned once the reader considers the context of the in-situ telescope optics in light of the present disclosure. Based on the baseline report and model of steps 35 and 36, at step 38, recommended corrective action is identified such as salvage and replacing the optics, repairing or refurbishing the optics, re-aligning the optics in field, or returning the optics for service. The thresholds for the making that determination can be chosen based on the objectives for which the optics are employed.

Figure 10:
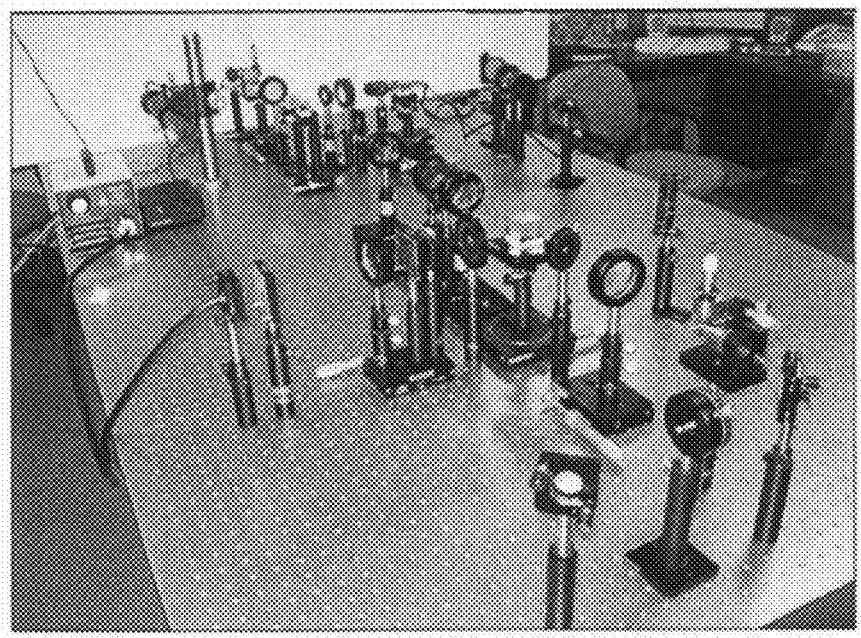
FIG. 10 is a photograph of an example TIME tool dual function experimental set up.

An example test setup used for testing the optics is shown in schematic form in FIG. 9 and photographic form in FIG. 10. In the test, a target ("object" 92) at bottom left of FIG. 9, such as an Air Force 3-bar target, is illuminated from behind by an incoherent light source 91 to provide an image of alternating light and dark bars of contrasting luminance. Representations of the target image are ultimately collected by three different CCD cameras 95, 96, and 97 and delivered to a computer 103 having an associated computer monitor. The computer processes the image information in accordance with the test parameters and weightings described above.

Figure 11A:
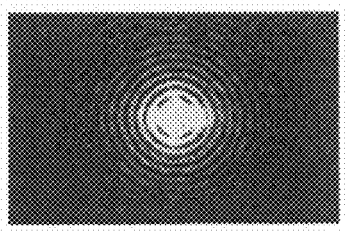
FIGS. 11a-11c are examples of data from the setup of FIGS. 9-10.
Figure 11B:
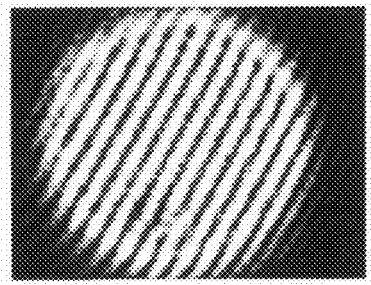
Figure 11C:
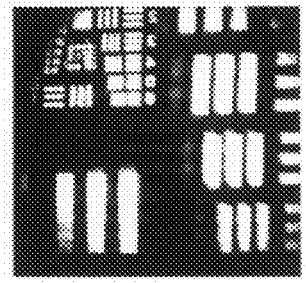

A first image path from, in order, the object 91, the polarizing beam combiner 93, the telescope 100 (under test), beam splitter 98, and polarizing beam splitter 99, to the CCD camera 97 yields the aberrated image to the computer monitor 103 shown in the bottom left corner of the monitor display. An example such image is also shown in FIG. 11c. Simultaneously, an interferogram of the test optics is produced in known fashion by CCD camera 96. Specifically, as is known in laser interferometry, a laser source 90 provides a beam through a polarizer and point source shown and into the polarized beam combiner 93 where it is combined with the object image from the object 92. The combination is carried to the interferometer 94 including CCD camera 96, which produces the image shown in the top right corner of the computer monitor of the computer 103. An example such image is also shown in FIG. 11b. Finally, the third CCD camera receives the magnified point spread function from the polarized beam splitter 99 preceding the CCD camera 97, after passing through a point spread function microscope objective. An example such image is also shown in FIG. 11a.

Upon receiving the image form the CCD camera 97, interferogram from CCD camera 96 and point spread function from CCD camera 95, the computer 103 processes the underlying information according to objective algorithms associated with the optical parameters and weightings chosen. That is, Peak-to-valley wavefront error, rms wavefront error, Strehl ratio, Zernike Coefficients (Coma, Astigmatism, etc.), MTF graph, Point Spread Function (PSF), or any other chosen objectively reproducible parameter is calculated from known equations using the information received by the computer 103. If desired, the parameters are weighted and then yield the baseline report at step 35, model image degradation values at step 36, and ultimately the threshold performance at step 37, described above with respect to FIG. 3. Software programs, such as the Labview software described above can be employed to evaluate the image, interferogram and point spread function objectively in the manner shown in FIGS. 12a-12t and the source code appendix. In the end, using the three path system to determine image, interferogram, and point spread function, no human subjectivity is involved in the evaluation of the telescope. Baselines can be established for future use and evaluations can be made effectively against those known baselines. The evaluation can also occur in-situ so the actual use conditions are employed for the telescope test.

FIG. 9 is an example test apparatus and alternatives will be apparent to the artisan who examines and understands this disclosure. For example, optics can be developed that allow the CCD cameras to be combined. The illumination source 91 does not have to be in the rear. Alternative structures for the interferometer are also known and can be employed. Alternative image capture devices, other than CCDs can be employed. The computer can be a dedicated processor for the functions identified or a programmed standard purpose computer.

Figure 4:
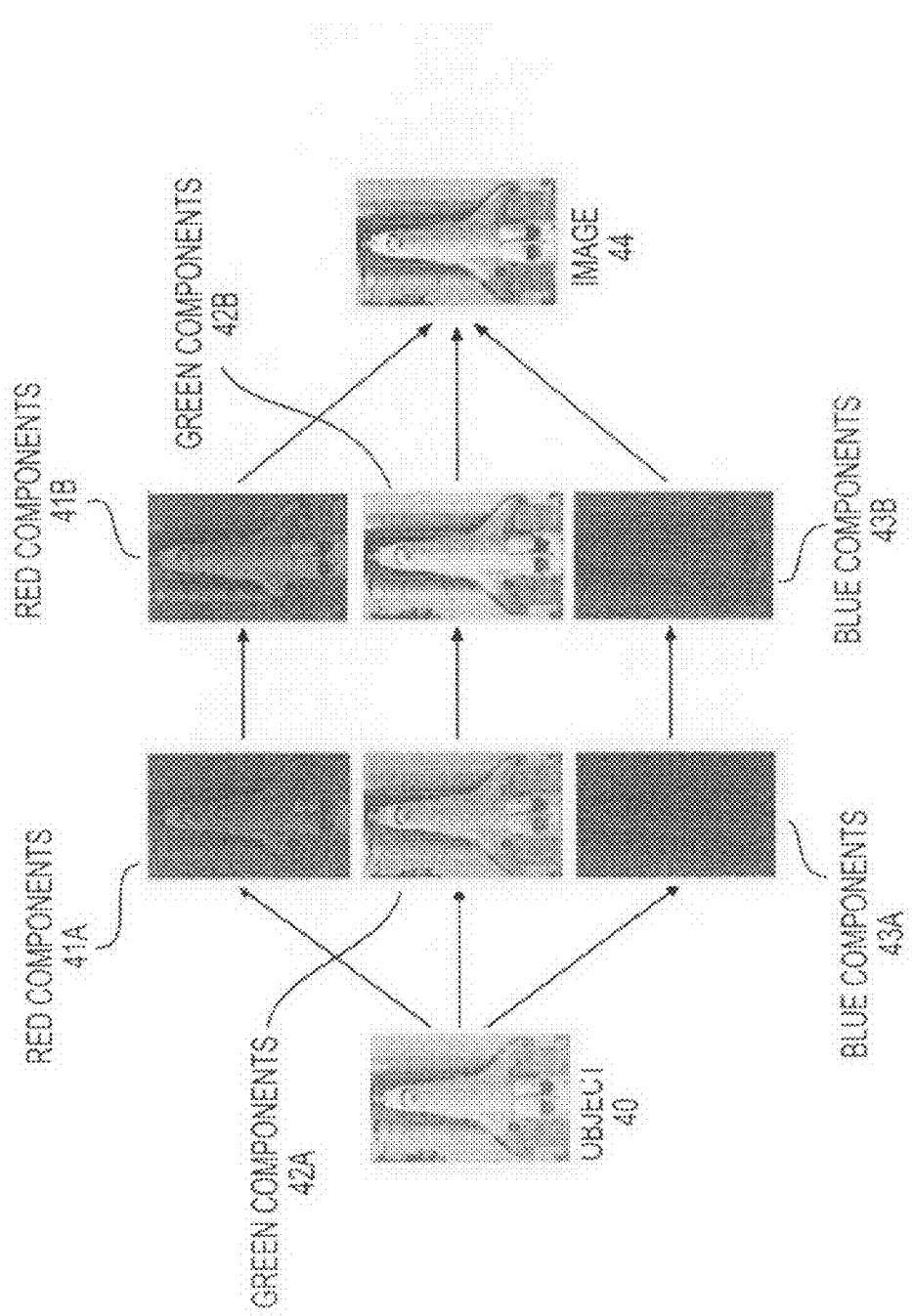
FIG. 4 is an example of modeling image degradation.

In FIG. 4, an example is shown of testing the optics after resolving a color image into its component parts. In the example shown, the component parts are red components 41a and 41b, green components 42a and 42b, and blue components 43a and 43b. in the test, using bitmap image format picture files as the object 40, the files are broken into their constituent color planes 41a-43a, each file begin degraded individually, then reassembled for a final output image 44.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A modeling apparatus for modeling telescope optics errors on a test bench, comprising, in a single optical path, an aperture stop, an aberration generator, and a lens, wherein the test bench includes a first optical path producing an interferogram associated with the modeled telescope errors and a second optical path, partially overlapping the first optical path, producing an image aberrated by the modeled telescope optics errors, the single optical path of the modeling apparatus being in both the first and second optical paths.

2. A modeling apparatus according to claim 1, wherein the first and second optical paths share a beam splitter, and an output of the modeling apparatus is input to the beam splitter.

* * * * *